US011953051B2

(12) United States Patent
Kodama

(10) Patent No.: US 11,953,051 B2
(45) Date of Patent: Apr. 9, 2024

(54) JOINT MECHANISM

(71) Applicant: SEIKO EPSON CORPORATION, Tokyo (JP)

(72) Inventor: Hidetoshi Kodama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 896 days.

(21) Appl. No.: 17/004,538

(22) Filed: Aug. 27, 2020

(65) Prior Publication Data

US 2021/0062838 A1 Mar. 4, 2021

(30) Foreign Application Priority Data

Aug. 30, 2019 (JP) ................. 2019-158395

(51) Int. Cl.
| | | |
|---|---|---|
| B65H 29/52 | (2006.01) | |
| B65H 5/36 | (2006.01) | |
| B65H 5/38 | (2006.01) | |
| F16B 5/06 | (2006.01) | |

(52) U.S. Cl.
CPC ........ F16B 5/0621 (2013.01); *B65H 2402/10* (2013.01); *B65H 2402/31* (2013.01); *B65H 2402/32* (2013.01); *B65H 2402/51* (2013.01); *B65H 2405/354* (2013.01)

(58) Field of Classification Search
CPC ............ B65H 2402/10; B65H 2402/31; B65H 2402/32; B65H 2402/51; B65H 2402/60; B65H 29/52; B65H 29/125; B65H 5/36; B65H 5/38

See application file for complete search history.

(56) References Cited

U.S. PATENT DOCUMENTS

| | | | | |
|---|---|---|---|---|
| 6,663,099 B2 * | 12/2003 | Inoue | ...................... | B65H 5/38 |
| | | | | 271/166 |
| 2010/0066009 A1 * | 3/2010 | Morita | .................. | B65H 29/52 |
| | | | | 271/185 |
| 2017/0282598 A1 * | 10/2017 | Segawa | ...................... | B41J 3/44 |
| 2017/0285559 A1 | 10/2017 | Masuta et al. | | |
| 2019/0300320 A1 * | 10/2019 | Fuchi | ...................... | B65H 5/38 |

FOREIGN PATENT DOCUMENTS

| | | | |
|---|---|---|---|
| JP | 2001-233541 A | 8/2001 |
| JP | 2006-091784 A | 4/2006 |
| JP | 2016-133635 A | 7/2016 |
| JP | 2017-178538 A | 10/2017 |
| JP | 2018-104141 A | 7/2018 |

* cited by examiner

*Primary Examiner* — Luis A Gonzalez
(74) *Attorney, Agent, or Firm* — WORKMAN NYDEGGER

(57) ABSTRACT

A joint mechanism includes a first route member and a second route member. The first route member includes; a first pivot point disposed in a first apparatus, which forms a portion of a transport route opposite a first surface of a sheet; and a first pivot section that extends from the first pivot point toward a second apparatus and that has a first abutment member. The second route member includes: a second pivot point disposed in the second apparatus, which forms a portion of the transport route opposite a second surface of the sheet; and a second pivot section that extends from the second pivot point toward the first apparatus and that has a second abutment member. The first abutment member abuts against the second route member and the second abutment member abuts against the first route member to maintain a space to transport the sheet.

20 Claims, 24 Drawing Sheets

JOINT MECHANISM

The present application is based on, and claims priority from JP Application Serial Number 2019-158395, filed Aug. 30, 2019, the disclosure of which is hereby incorporated by reference herein in its entirety.

BACKGROUND

1. Technical Field

The present disclosure relates to joint mechanisms.

2. Related Art

There are cases where sheet-shaped media are transported between a first apparatus and a second apparatus. For this purpose, it is necessary to join the first and second apparatuses together with their transport routes for the media aligned. As an example of this joint mechanism, JP-A-2017-178538 discloses a mechanism for aligning the transport routes of an image forming apparatus and an optional apparatus by using a variable-height caster.

To align the transport routes of first and second apparatuses by using a caster, however, the user needs to make fine adjustments by trial and error, which can be a heavy burden on the user.

SUMMARY

The present disclosure is a joint mechanism that joins a first apparatus to a second apparatus. This joint mechanism has a transport route along which a sheet-shaped medium is to be transported from the first apparatus to the second apparatus. The joint mechanism includes a first route member and a second route member. The first route member includes: a first pivot point disposed in the first apparatus, which forms a portion of a transport route opposite a first surface of the sheet-shaped medium; a first pivot section that extends from the first pivot point toward the second apparatus and is pivotable about the first pivot point; and a first abutment member disposed in the first pivot section. The second route member includes: a second pivot point disposed in the second apparatus, which forms a portion of the transport route opposite a second surface of the sheet-shaped medium, the second surface being the reverse of the first surface; a second pivot section that extends from the second pivot point toward the first apparatus and is pivotable about the second pivot point; and a second abutment member disposed in the second pivot section. The first abutment member abuts against the second route member and the second abutment member abuts against the first route member to maintain a space to transport the sheet-shaped medium.

DESCRIPTION OF EXEMPLARY EMBODIMENTS

Figure 1:
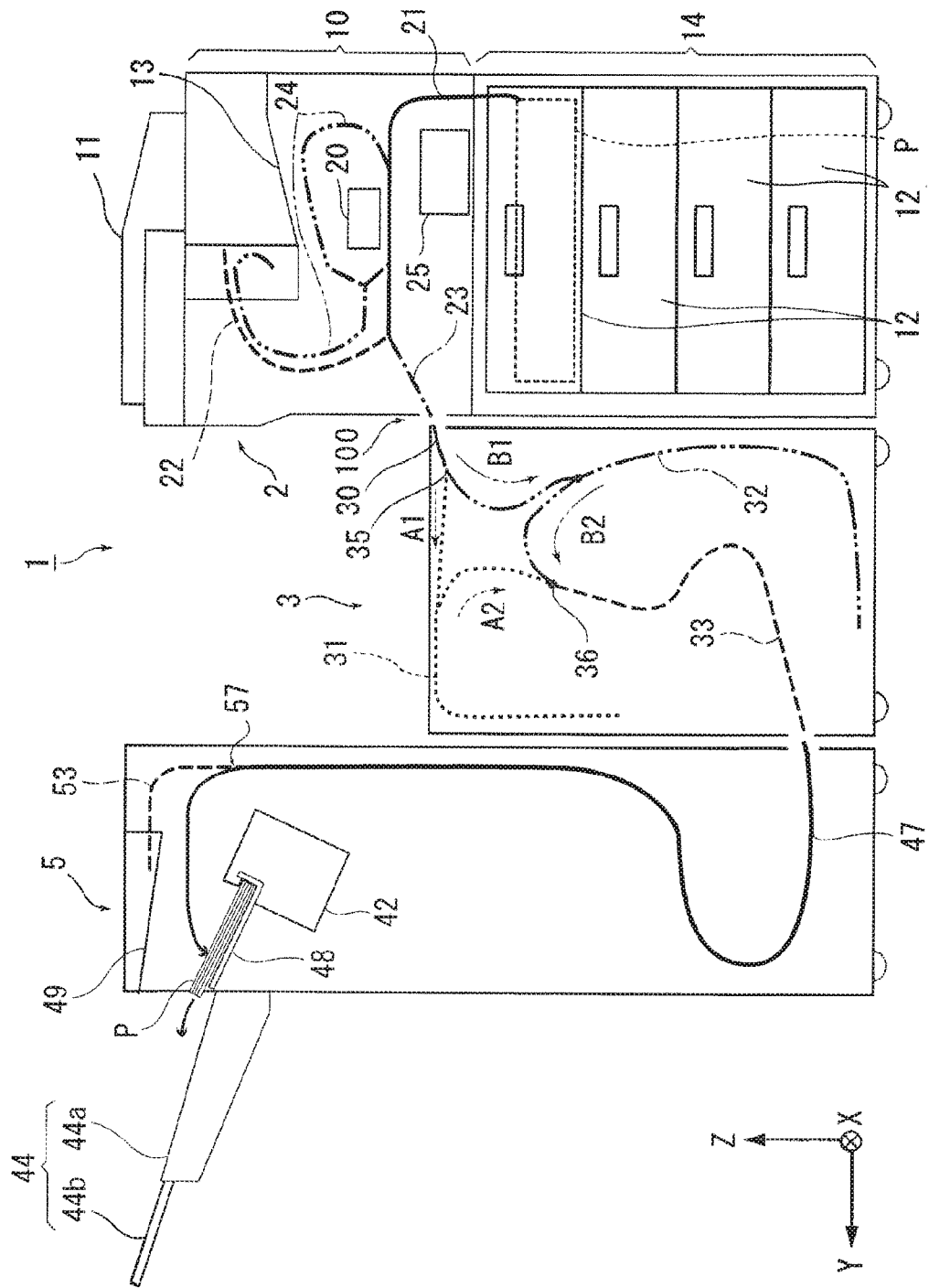
FIG. 1 schematically illustrates a recording system equipped with a joint mechanism according to an embodiment of the present disclosure.

Summaries of the present disclosure will be described below.

According to a first aspect of the present disclosure, a joint mechanism joins a first apparatus to a second apparatus and has a transport route along which a sheet-shaped medium is to be transported from the first apparatus to the second apparatus. This joint mechanism includes a first route member and a second route member. The first route member includes: a first pivot point disposed in the first apparatus, which forms a portion of a transport route opposite a first surface of the sheet-shaped medium; a first pivot section that extends from the first pivot point toward the second apparatus and is pivotable about the first pivot point; and a first abutment member disposed in the first pivot section. The second route member includes: a second pivot point disposed in the second apparatus, which forms a portion of the transport route opposite a second surface of the sheet-shaped medium opposite the first surface; a second pivot section that extends from the second pivot point toward the first apparatus and is pivotable about the second pivot point; and a second abutment member disposed in the second pivot section. The first abutment member abuts against the second route member and the second abutment member abuts against the first route member to maintain a space to transport the sheet-shaped medium.

In the foregoing first aspect, since the first route member is provided with both the first pivot point and the first pivot section, and the second route member is provided with both the second pivot point and the second pivot section. Thus, at the junction between the first apparatus and the second apparatus, the first and second route members can deform the transport route of the joint mechanism in a substantially rhomboid shape as viewed from one longitudinal side. Therefore, when the first apparatus is joined to the second apparatus via the joint mechanism, even if one of the first and second apparatuses is shifted from a horizontal line along which they are to be arranged or a vertical line intersecting the horizontal line, the joint mechanism can allow for this shift. Furthermore, at the junction between the first and second apparatuses, the first abutment member abuts against the second route member, and the second abutment member also abuts against the first route member, thereby maintaining a space to transport a sheet-shaped medium. Consequently, it is possible to allow for some misalignment of transport routes for a sheet-shaped medium in the first apparatus and in the second apparatus.

According to a second aspect of the present disclosure, the joint mechanism in the first aspect may further include: a first press section that presses the first pivot section against the second route member when the first apparatus is joined to the second apparatus; and a second press section that presses the second pivot section against the first route member when the first apparatus is joined to the second apparatus.

In the foregoing second aspect, the first press section presses the first pivot section against the second route member, and the second press section also presses the second pivot section against the first route member. As a result, the first abutment member abuts against the second route member, and the second abutment member abuts against the first route member, thereby maintaining an appropriate distance between sheet-shaped media being transported.

According to a third aspect of the present disclosure, the joint mechanism in the first or second aspect may further include an anti-interference member that, when the first apparatus is joined to the second apparatus, moves one of the first pivot section and the second pivot section away from within a movable range of the other and makes the one of the first pivot section and the second pivot section stay where the one of the first pivot section and the second pivot section does not disturb a movement of the other.

In the foregoing third aspect, when the first apparatus is joined to the second apparatus, the anti-interference member moves one of the first pivot section and the second pivot section from within the movable range of the other to where the one of the first pivot section and the second pivot section does not disturb the movement of the other. Consequently, it is possible to prevent one or both of the first pivot section and the second pivot section from being an obstacle to join the first apparatus to the second apparatus.

According to a fourth aspect of the present disclosure, in the joint mechanism in one of the first to third aspects, the transport route formed by the first route member and the second route member may slope with reference to a line in which the first apparatus and the second apparatus are arranged when the first apparatus is joined to the second apparatus.

In the fourth aspect, since the transport route at the junction between the first apparatus and the second apparatus slopes, one or both of the first route member and the second route member are movable along a line in which the first apparatus and the second apparatus are arranged and its intersecting line. Consequently, it is possible to easily join the first apparatus to the second apparatus or easily disconnect the first apparatus from the second apparatus.

According to a fifth aspect of the present disclosure, in the joint mechanism in the fourth aspect, when the first apparatus is joined to the second apparatus, the transport route formed by the first route member and the second route member may slope down from the first apparatus to the second apparatus. In addition, the first surface may be oriented upward, and the second surface may be oriented downward.

In the foregoing fifth aspect, the transport route formed by the first route member and the second route member slopes down from the first apparatus to the second apparatus. In addition, when the first apparatus is joined to the second apparatus, the first surface is oriented upward, and the second surface is oriented downward. Therefore, for example, the first route member is movable along a horizontal line in which the first apparatus and the second apparatus are arranged. Consequently, it is possible to further easily join the first apparatus to the second apparatus or easily disconnect the first apparatus from the second apparatus.

According to a sixth aspect of the present disclosure, in the joint mechanism in one of the first to fifth aspects, the first route member and the second apparatus joined together may be configured to be separated from each other by displacing the first route member along a line in which the first apparatus and the second apparatus are arranged.

In the foregoing sixth aspect, the first route member and the second apparatus joined together may be configured to be separated from each other by displacing the first route member along a line in which the first apparatus and the second apparatus are arranged. Consequently, it is possible to easily join the first apparatus to the second apparatus or easily disconnect the first apparatus from the second apparatus.

The following will describe a joint mechanism 100 according to an embodiment of the present disclosure with reference to the accompanying drawings. These drawings employ an X-Y-Z coordinate system, in which the X-axis extends along the depth of a recording system 1, the Y-axis extends along the width of the recording system 1, and the Z-axis extends along the height of the recording system 1. Herein, the recording system 1 may correspond to an example of an apparatus equipped with the joint mechanism 100. The recording system 1 includes a recording unit 2, an intermediate unit 3, and an end unit 5.

Outline of Recording System

In the recording system 1, for example, the recording unit 2, the intermediate unit 3, and the end unit 5 are arranged in this order from the right side to the left side of the page of FIG. 1. FIG. 1 is a front view of the recording system 1. A user in front of the recording system 1 can perform various operations. The recording unit 2 records predetermined information on sheet-shaped media P being transported. Then, the intermediate unit 3 receives the media P from the recording unit 2 and transports them to the end unit 5. The end unit 5 binds the received media P by bonding their one sides. Hereinafter, details of the recording unit 2, the intermediate unit 3, and the end unit 5 will be described in this order.

Recording Unit

The recording unit 2 will be described with reference to FIG. 1. The recording unit 2, which may be a recording section that records information on the media P, functions as a printer 10 equipped with a line head 20 and a multi-function printer (MFP) equipped with a scanner 11. In this embodiment, the line head 20 may be an ink jet recording head that records information on a medium P by discharging liquid ink onto it.

Disposed under the printer 10 is a cassette container 14 that accommodates a plurality of medium cassettes 12. When a medium P is fed from one of the medium cassettes 12 to a recording region along a feed route 21 indicated by the solid line in FIG. 1, the line head 20 records information on the medium P. Then, the medium P is transported along a first ejection route 22 or a second ejection route 23; the first ejection route 22 leads to an ejection tray 13 over the line head 20, and the second ejection route 23 leads to the intermediate unit 3.

In FIG. 1, the first ejection route 22 is indicated by the dashed line, and the second ejection route 23 is indicated by the alternate long and short dash line. If the medium P is transmitted along the second ejection route 23 extending in the +Y direction in the recording unit 2, the medium P reaches a reception route 30 in the intermediate unit 3 disposed next to the recording unit 2. The joint mechanism 100, which is a main component in the recording system 1 in this embodiment, joins both the transport routes for the medium P in the recording unit 2 and in the intermediate unit 3. Details of the joint mechanism 100 will be described later.

The recording unit 2 includes a turnover route 24 indicated by the alternate long and two short dashes line in FIG. 1. The turnover route 24 is provided in order to perform double-side recording. More specifically, after information has been recorded on a first surface of the medium P, the medium P is fed to the turnover route 24 and turned over, and then information is recorded on a second surface of the medium P. Disposed on each of the feed route 21, the first ejection route 22, the second ejection route 23, and the turnover route 24 may be one or more unillustrated transport roller pairs, which may be an example of a mechanism for transporting the medium P.

The recording unit 2 further includes a controller 25 that controls operations of the recording unit 2 in such a way that the medium P is transported and information is recorded on it. In the recording system 1, the medium P can be transported between the recording unit 2, the intermediate unit 3, and the end unit 5, all of which are mechanically and electrically interconnected. The controller 25 can also control various operations of the intermediate unit 3 and the end unit 5, which are connected to the recording unit 2.

The recording system 1 further includes an unillustrated operation panel that allows the user to make settings of the recording unit 2, the intermediate unit 3, and the end unit 5. As an example, this operation panel may be disposed in the recording unit 2.

Intermediate Unit

The intermediate unit 3 will be described with reference to FIGS. 1 to 8. First, an outline of the intermediate unit 3 will be described with reference to FIG. 1. The intermediate unit 3 is disposed between the recording unit 2 and the end unit 5. The intermediate unit 3 receives the medium P from the recording unit 2 and transports it to the end unit 5. When the medium P is transported along the second ejection route 23 in the recording unit 2, it reaches the reception route 30 in the intermediate unit 3 and then further transported to the end unit 5 through the reception route 30. In FIG. 1, the reception route 30 is indicated by the solid line.

The intermediate unit 3 has two routes along which a medium P is to be transported. Of these routes, the first one includes: the reception route 30; a first switchback route 31 indicated by the dotted line in FIG. 1; and a merging route 33, and the second one includes: the reception route 30; a second switchback route 32 indicated by the alternate long and two short dashes line in FIG. 1; and the merging route 33. When the medium P is transported in the direction of an arrow A1 along the first switchback route 31, it is fed back in the direction of an arrow A2. When the medium P is transported in the direction of an arrow B1 along the second switchback route 32, it is fed back in the direction of an arrow B2.

The reception route 30 is separated into the first switchback route 31 and the second switchback route 32, described above, at a branching point 35. Disposed at the branching point 35 is a flap 301 (see FIG. 2), which switches the route for the medium P between the first switchback route 31 and the second switchback route 32.

The first switchback route 31 and the second switchback route 32 are merged together at the merging point 36. In short, whether the medium P has been transported from the reception route 30 to the first switchback route 31 or to the second switchback route 32, the medium P reaches the end unit 5 via the merging route 33.

After being transported in the +Y direction along the merging route 33 in the intermediate unit 3, the medium P reaches a first transport route 47 in the end unit 5. Disposed on each of the reception route 30, the first switchback route 31, the second switchback route 32, and the merging route 33 are a plurality of transport roller pairs 302 (see FIG. 2).

If the recording unit 2 sequentially records information on a plurality of media P, the intermediate unit 3 may alternately feed the media P to the transport routes leading to the first switchback route 31 and to the second switchback route 32, in order to increase its transport throughput.

If a recording unit equipped with a line head records information on a media by discharging liquid ink onto it, the media may be wet when reaching an end unit disposed downstream of the recording unit. In this case, the information printed on the media P might smear or the media P might be misaligned. In this embodiment, however, since the intermediate unit 3 is interposed between the recording unit 2 and the end unit 5, a transport time is sufficiently reserved such that the media P are dried until they have reached the end unit 5.

Figure 2:
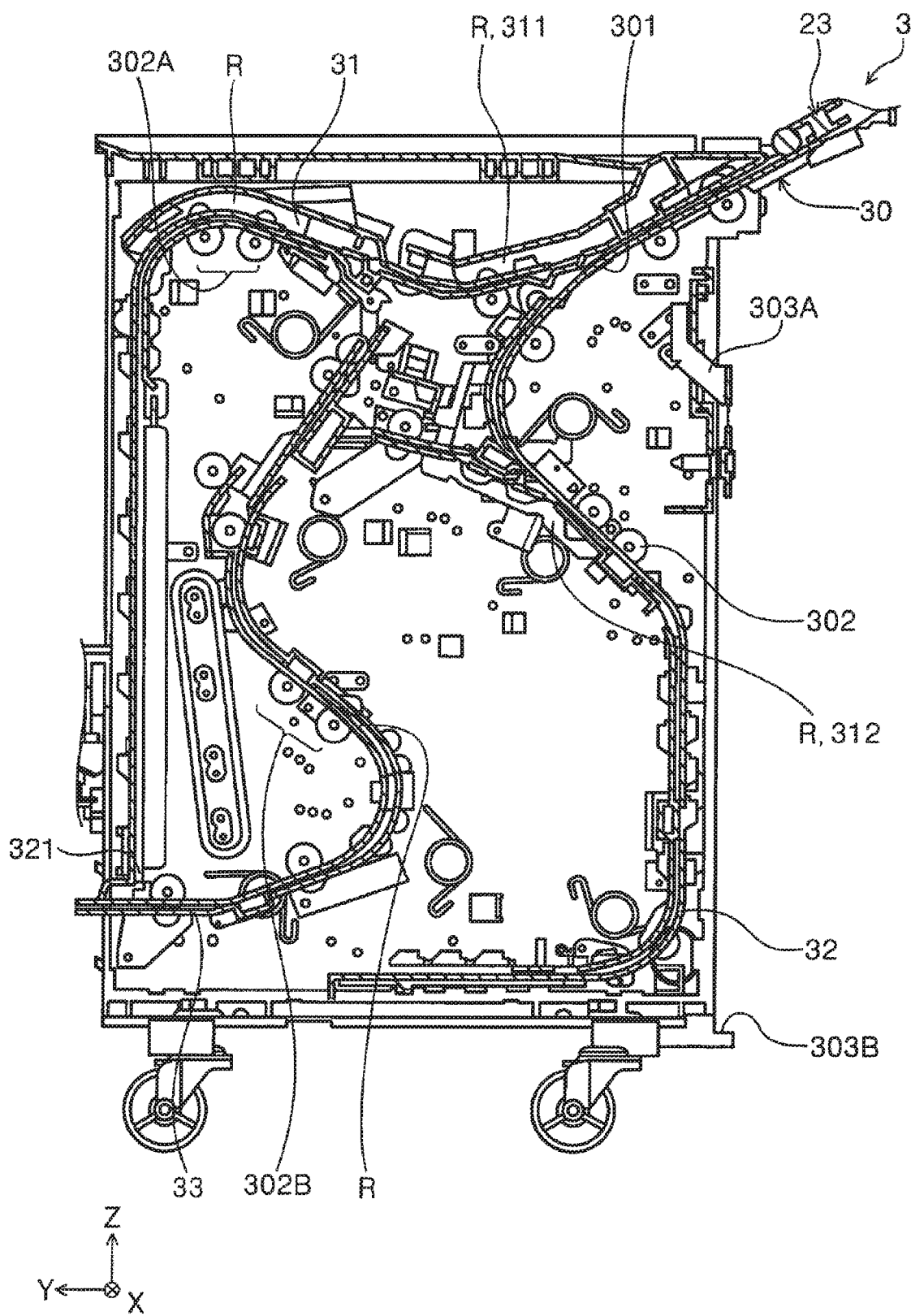
FIG. 2 illustrates an internal configuration of the intermediate unit in the recording system of FIG. 1.

The intermediate unit 3 will be described with reference to FIGS. 2 to 8. The intermediate unit 3 is joined to the recording unit 2 via a joints 303A and 303B as illustrated in FIG. 2 and other drawings. More specifically, the joint 303A, which is disposed on the upstream side of the intermediate unit 3 and extends along the X-axis, fixes the intermediate unit 3 to the recording unit 2 by using its latch structure. Furthermore, the joint 303B, which protrudes in the −Y direction and is rotatable around the X-axis passing through the joint 303A, adjusts the position of the intermediate unit 3 relative to the recording unit 2 by abutting against the recording unit 2 because of the weight of the intermediate unit 3. The structures of the joints 303A and 303B suppress the intermediate unit 3 from rotating around the X-axis and thus being displaced from the recording unit 2.

Figure 3:
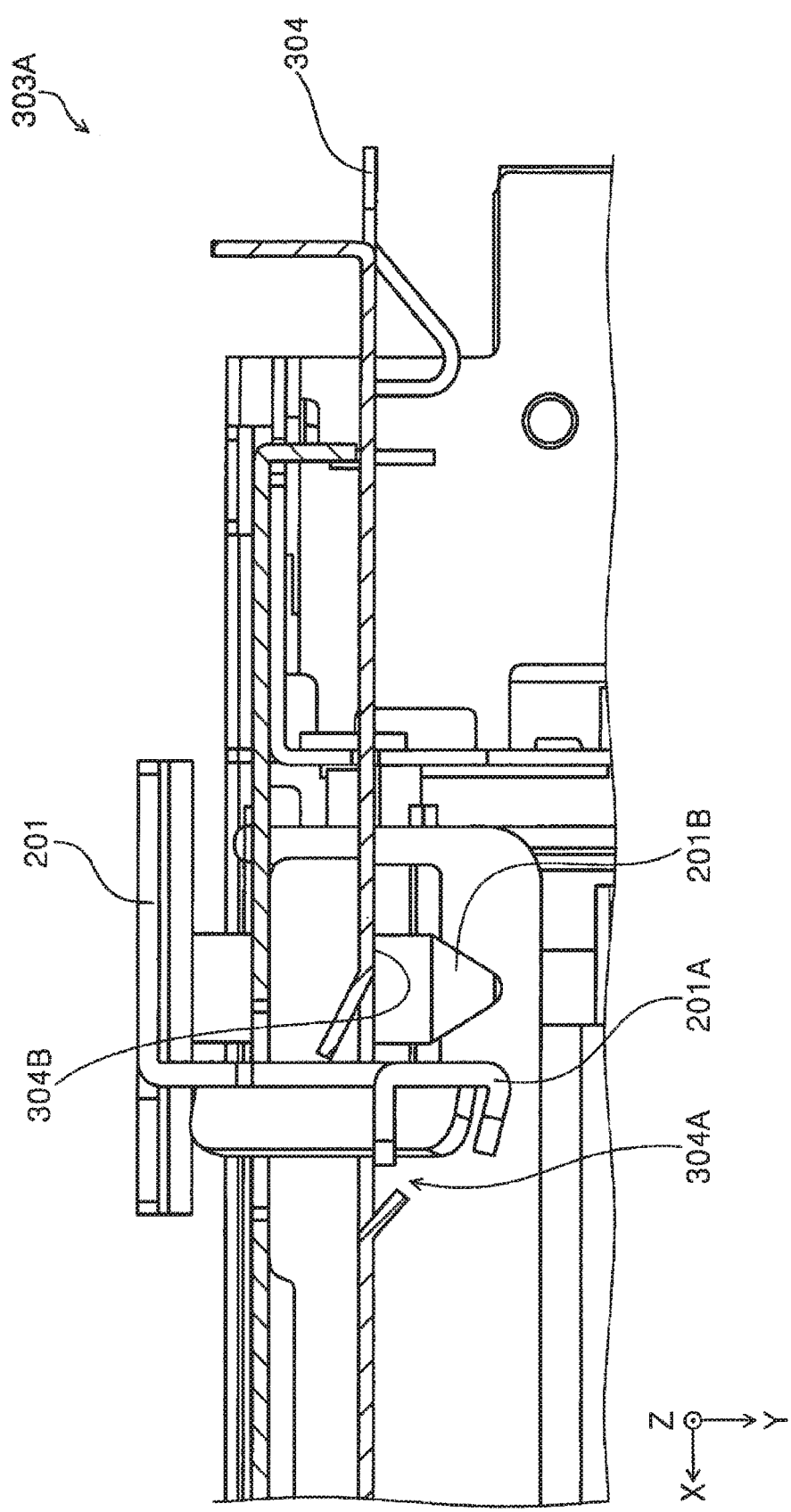
FIG. 3 is a plan view of a joint in an unlocked state between the recording unit and the intermediate unit.
Figure 4:
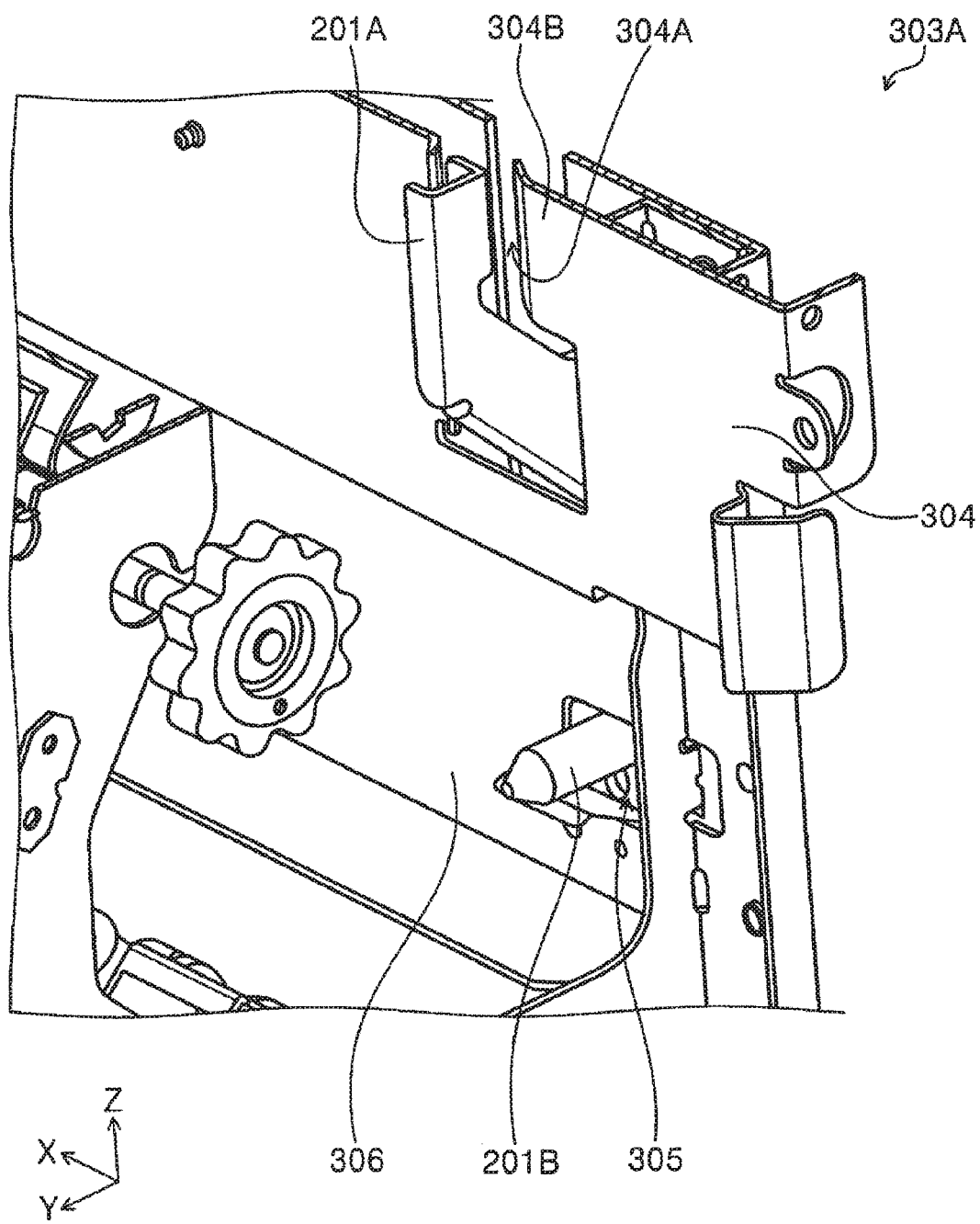
FIG. 4 is a perspective view of the joint in the unlocked state between the recording unit and the intermediate unit.
Figure 5:
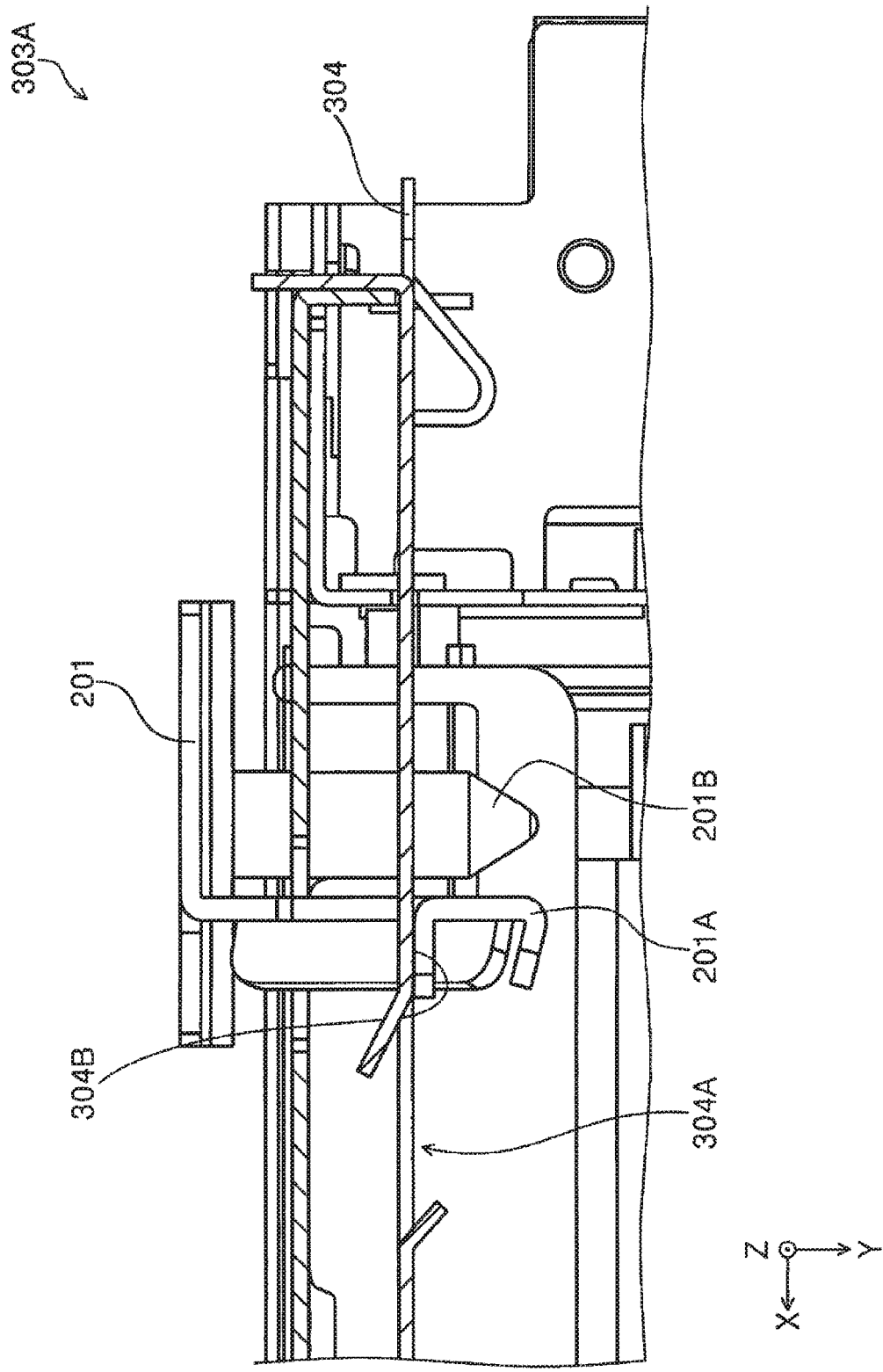
FIG. 5 is a plan view of the joint in a locked state between the recording unit and the intermediate unit.
Figure 6:
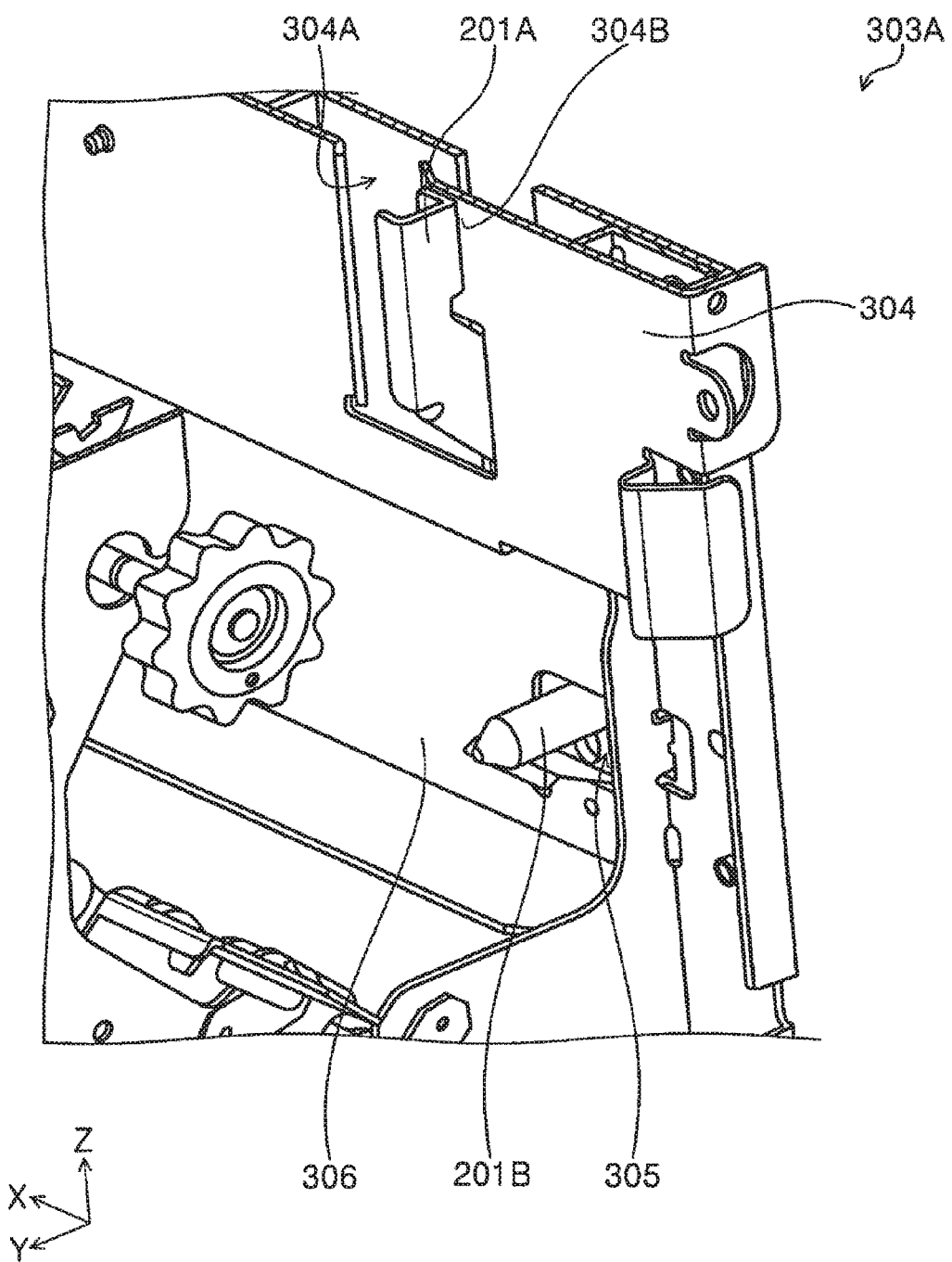
FIG. 6 is a perspective view of the joint in the locked state between the recording unit and the intermediate unit.

The joint 303A will be described with reference to FIGS. 3 to 6. In FIGS. 3 and 4, the latch structure of the joint 303A is unlocked. In FIGS. 5 and 6, a recording-unit-side joint 201 disposed in the recording unit 2 is joined to the joint 303A with the latch structure locked.

The recording-unit-side joint 201 has a fitting projection 201A and a positioning projection 201B for use in adjusting the position of the recording unit 2 along the Z-axis. The joint 303A has an arm 304 movable along the X-axis and an aperture 304A through which the fitting projection 201A is to be passed while the arm 304 is shifted in the −X direction. The intermediate unit 3 further includes a frame 306 with a hole 305 through which the positioning projection 201B is to be passed.

To join the intermediate unit 3 to the recording unit 2, the user needs to insert the positioning projection 201B into the hole 305 while shifting the arm 304 in the −X direction and also to insert the fitting projection 201A into the aperture 304A, as illustrated in FIGS. 3 and 4. Then, he/she needs to shift the arm 304 in the +X direction. As a result, as illustrated in FIGS. 5 and 6, the fitting projection 201A engages with the wall 304B positioned adjacent to the aperture 304A. As a result, the intermediate unit 3 is joined to the recording unit 2, and the latching structure of the joint 303A is locked. By performing this process in the opposite order, the user can unlock the joint 303A and disconnect the intermediate unit 3 from the recording unit 2.

Figure 7:
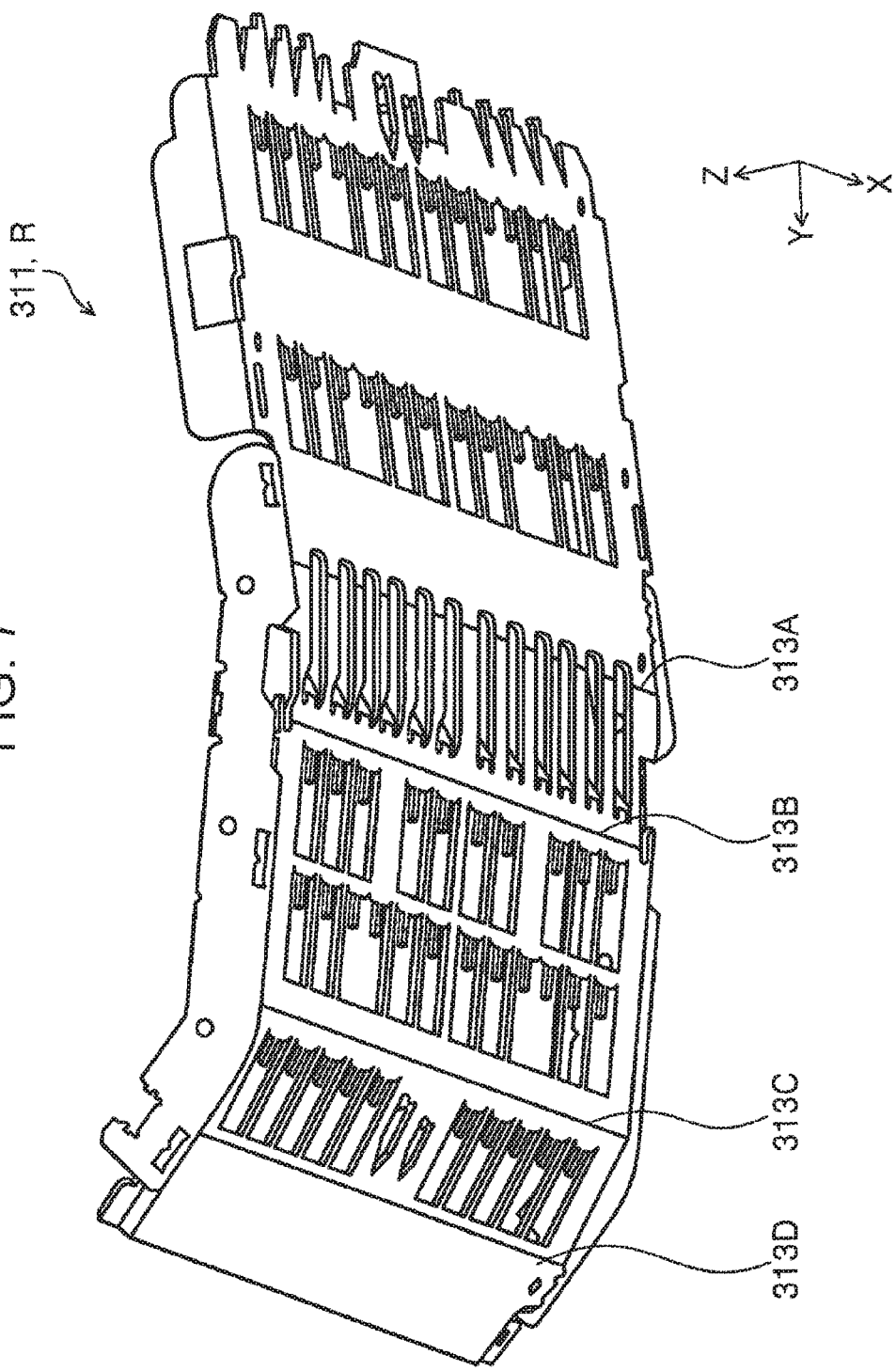
FIG. 7 is a perspective view of a metal sheet that forms the transport route for a medium.

As illustrated in FIG. 2, the intermediate unit 3 further includes a plurality of curl/transport regions R in which a medium P is to be transported in curled form. Examples of the curl/transport regions R include a first region 311 and a second region 312, each of which is defined by a curved metal plate. FIG. 7 illustrates the metal plate for use defining the first region 311. As illustrated in FIG. 7, the metal plate for use in defining the first region 311 having four angled portions. This metal plate may be formed by welding welded sections 313A, 313B, 313C, and 313D of five independent flat plates. If the metal plate is formed of a single plate, it may be difficult to bend accurately; however, each of the first region 311 and the second region 312 in this embodiment is formed by welding a plurality of metal plates, so that the first region 311 and the second region 312 can be bent accurately.

As illustrated in FIG. 2, disposed side by side upstream of the sharply curled point in each curl/transport region R is two transport roller pairs 302, such as transport roller pairs 302A and 302B. The efficiency of applying a transport force to a medium P tends to decrease in each curl/transport region R; however, by disposing side by side the two transport roller pairs 302 in each curl/transport region R, an accurate transport of the medium P can be kept, and the roller arrangement in the intermediate unit 3 can be shrunk, which contributes to compactness of the intermediate unit 3.

Figure 8:
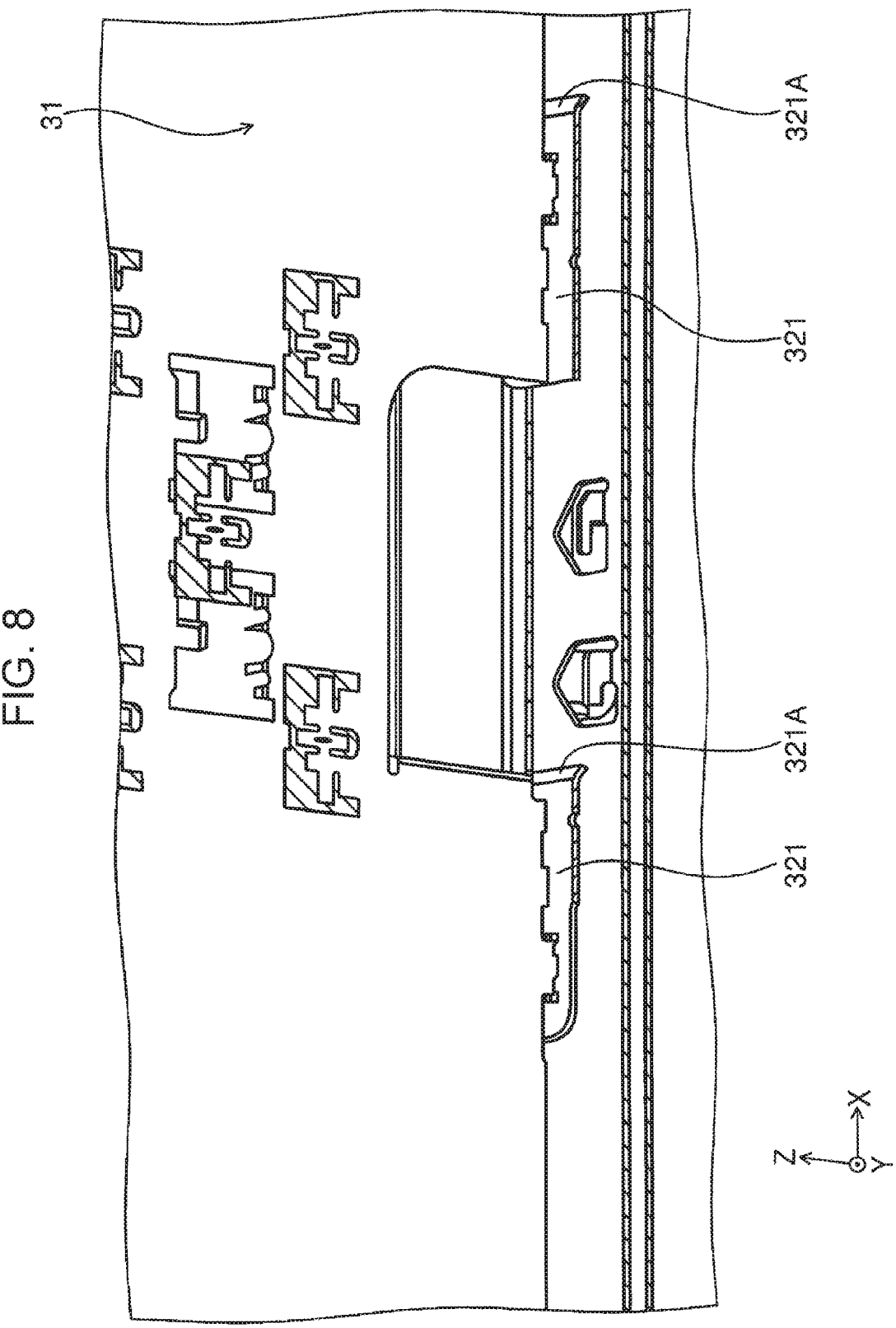
FIG. 8 schematically illustrates the lower members of the first switchback route in the intermediate unit.

If the intermediate unit 3 in this embodiment fails to transport a medium P along the first switchback route 31, the user can remove it from the interior of the intermediate unit 3 by detaching the cover disposed on the −X side, or the front cover in the page of FIG. 2, and pulling out the medium P in the −X direction. However, if the medium P is stuck inside a downstream portion of the first switchback route 31, the user sometimes has a difficulty pulling out the medium P in the −X direction because the medium P may be brought into contact with lower members 321 in the first switchback route 31. Therefore, the intermediate unit 3 in this embodiment has slopes 321A in the lower members 321 in the first switchback route 31, as illustrated in FIG. 8. The slopes 321A help the user pull out the medium P in the −X direction because they reduce the risk of the lower members 321 interfering with the pullout of the medium P when the medium P is brought into contact with the lower members 321 in the first switchback route 31. In this way, it is possible to suppress the medium P from being caught by the lower members 321 and torn if the user removes a medium P stuck inside the first switchback route 31 from the intermediate unit 3.

End Unit

The end unit 5 will be described with reference to FIG. 1. The end unit 5 is provided with the first transport route 47 leading to a processor 42, by which media P are to be bound together with their one sides bonded.

The end unit 5 includes a first tray 44 that receives the media P that have been bounded by the processor 42. The first tray 44 protrudes in the +Y direction from the end unit 5. In this embodiment, the first tray 44 has a base 44a and an extension 44b that is retractable into the base 44a.

In this embodiment, the processor 42 may be implemented by a stapler that binds a plurality of media P by bonding their one sides. Alternatively, the processor 42 may be implemented by a punch that makes one or more holes in the media P at predetermined locations.

After having reached the end unit 5, media P are transported along the first transport route 47 indicated by the solid line in FIG. 1. Then, the media P reach the processing tray 48 and are stacked on the processing tray 48 with their rear sides in the transport direction aligned. When a predetermined number of media P are stacked on the processing tray 48, the processor 42 binds them. Then, an unillustrated ejection mechanism ejects the media P to the first tray 44.

The first transport route 47 leads to a second transport route 53, which branches off from the first transport route 47 at a branching point 57. After transported along the second transport route 53, a medium P is ejected to an upper tray 49 disposed on the top of the end unit 5. The media P stacked on the upper tray 49 does not necessarily have to be bound to one another.

Disposed on each of the first transport route 47 and the second transport route 53 may be one or more unillustrated transport roller pairs, which may be an example of the mechanism for transporting the medium P. Disposed at the branching point 57 is an unillustrated flap that switches the route along which the medium P is to be transported.

Joint Mechanism

The joint mechanism 100 will be described in detail with reference to FIGS. 9 to 24. As described above, the joint mechanism 100 in this embodiment joins both the transport routes for a medium P in the recording unit 2 and in the intermediate unit 3. More specifically, the joint mechanism 100 joins an upstream guide unit 101 in the recording unit 2 to a downstream guide unit 102 in the intermediate unit 3; the upstream guide unit 101 partly forms the second ejection route 23 in the recording unit 2, and the downstream guide unit 102 partly forms the reception route 30 in the intermediate unit 3. Herein, the recording unit 2 may correspond to a first apparatus, the intermediate unit 3 may correspond to a second apparatus, the upstream guide unit 101 may correspond to a first route member, and the downstream guide unit 102 may correspond to a second route member.

Figure 9:
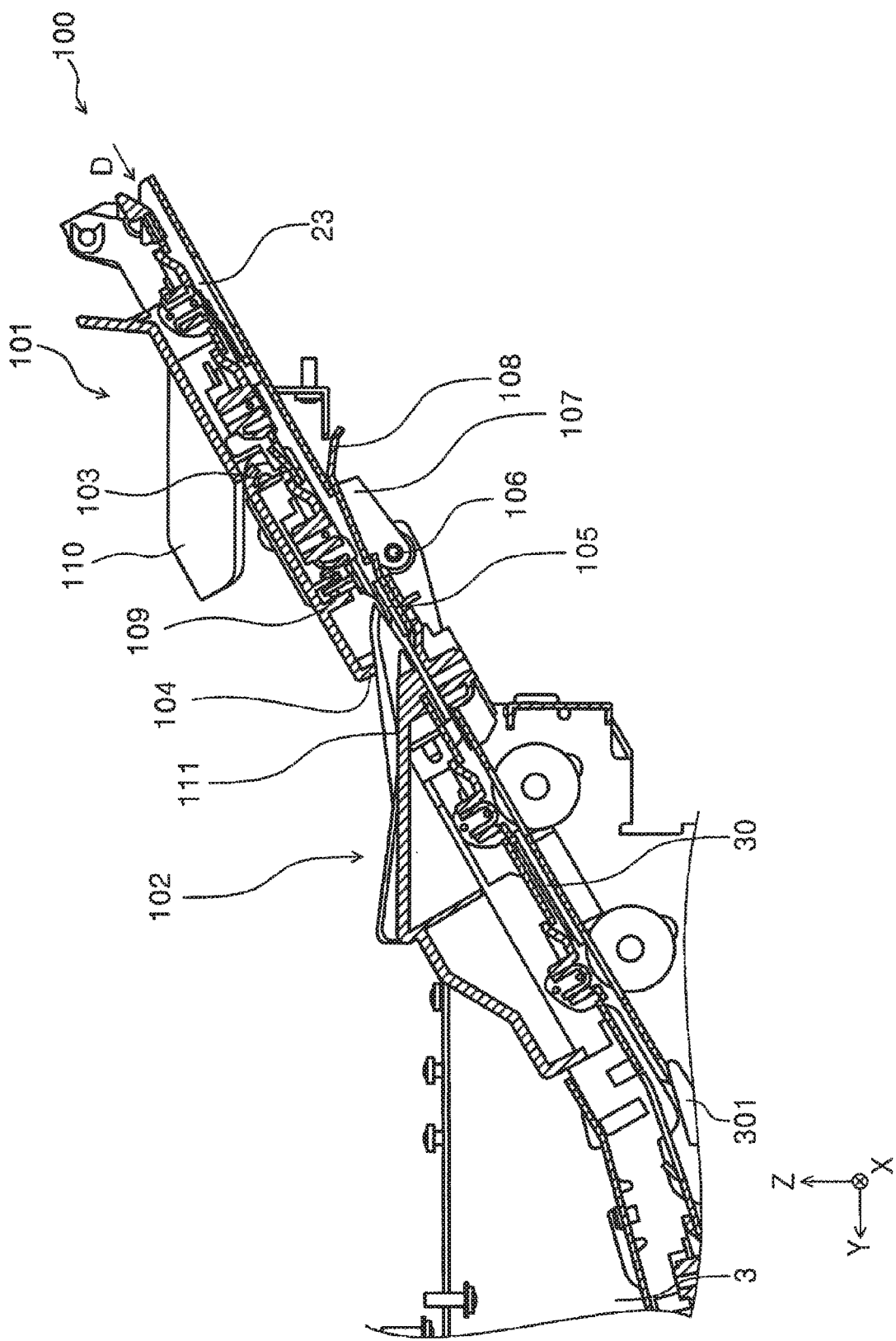
FIG. 9 is a schematic sectional view of the joint mechanism.

As illustrated in FIG. 9, the upstream guide unit 101 includes a first pivot point 103, a first pivot section 104, and a first abutment member 105. The first pivot point 103 is disposed in the recording unit 2 and forms a portion of the transport route opposite a first surface of a medium P. The first pivot section 104 extends from the first pivot point 103 toward the intermediate unit 3 and is pivotable about the first pivot point 103. The first abutment member 105 is disposed in the first pivot section 104. The first surface of the medium P refers to one surface of the medium P being transported along the transport route in the joint mechanism 100 and thus it is oriented toward the upper left side of the page of FIG. 9". The second surface of the medium P refers to the other surface of the medium P being transported along the transport route in the joint mechanism 100 and thus it is oriented toward the lower right side of the page of FIG. 9", the second surface of the medium P being the reverse of the first surface.

The downstream guide unit 102 includes a second pivot point 106, a second pivot section 107, and a second abutment member 108. The second pivot point 106 is disposed in the intermediate unit 3 and forms a portion of the transport route opposite the second surface of the medium P. The second pivot section 107 extends from the second pivot point 106 toward the recording unit 2 and is pivotable about the second pivot point 106. The second abutment member 108 is disposed in the second pivot section 107. The first abutment member 105 abuts against the downstream guide unit 102, and the second abutment member 108 also abuts against the upstream guide unit 101, thereby maintaining a space to transport the medium P. Both the first abutment member 105 and the second abutment member 108 are arranged near the both sides of the medium P along its width in order to avoid an interference with the transport of the medium P.

In the joint mechanism 100, the upstream guide unit 101 with both the first pivot point 103 and the first pivot section 104 and the downstream guide unit 102 with both the second pivot point 106 and the second pivot section 107 form the transport route at the junction between the recording unit 2 and the intermediate unit 3. This transport route is deformable in a substantially rhomboid shape as viewed from one longitudinal side. Thus, the recording unit 2 can be joined to the intermediate unit 3 so as to allow for some misalignment of the recording unit 2 and the intermediate unit 3, for example, along the Y-axis on which the recording unit 2 and the intermediate unit 3 are arranged horizontally and along the Z-axis that intersects the Y-axis and extends vertically. Moreover, at this junction, the first abutment member 105 abuts against the downstream guide unit 102, and the second abutment member 108 also abuts against the upstream guide unit 101, thereby maintaining a space to transport the medium P. With this configuration, the joint mechanism 100 can allow for some misalignment of both the transport routes for a medium P in the recording unit 2 and in the intermediate unit 3 at the junction.

In this embodiment, the joint mechanism 100 with the above configuration can appropriately control the distance between media P in a sheet shape being transported. By appropriately controlling the distance, the media P can reliably pass the junction between the transport routes. For example, if a first medium P that has been curled by a recording operation using liquid ink is transported while being excessively apart from a second medium P, the first medium P is further curled and its front portion is buckled at the junction between the transport routes, in which case the first medium P may be stuck. In this embodiment, however, the joint mechanism 100 appropriately controls the distance between the media P being transported, thereby suppressing the media P from being largely curled, namely, front portions of the media P from being buckled.

With reference to FIGS. 16A to 18C, a description will be given of the transport route formed by the joint mechanism 100 which is deformable in a substantially rhomboid shape as viewed from one longitudinal side. In each of FIGS. 16A, 16B, and 16C, the recording unit 2 and the intermediate unit 3, more specifically, the upstream guide unit 101 and the downstream guide unit 102 are joined together while being apart from each other along the Y-axis by a distance about 5 mm shorter than a standard distance. Moreover, in FIG. 16A, the upstream guide unit 101 is positioned apart from the downstream guide unit 102 along the Z-axis by a distance about 5 mm longer than the standard distance. In FIG. 16B, the upstream guide unit 101 is positioned apart from the downstream guide unit 102 along the Z-axis by the standard distance. In FIG. 16C, the upstream guide unit 101 is positioned apart from the downstream guide unit 102 along the Z-axis by a distance about 5 mm shorter than the standard distance.

Figure 17A:
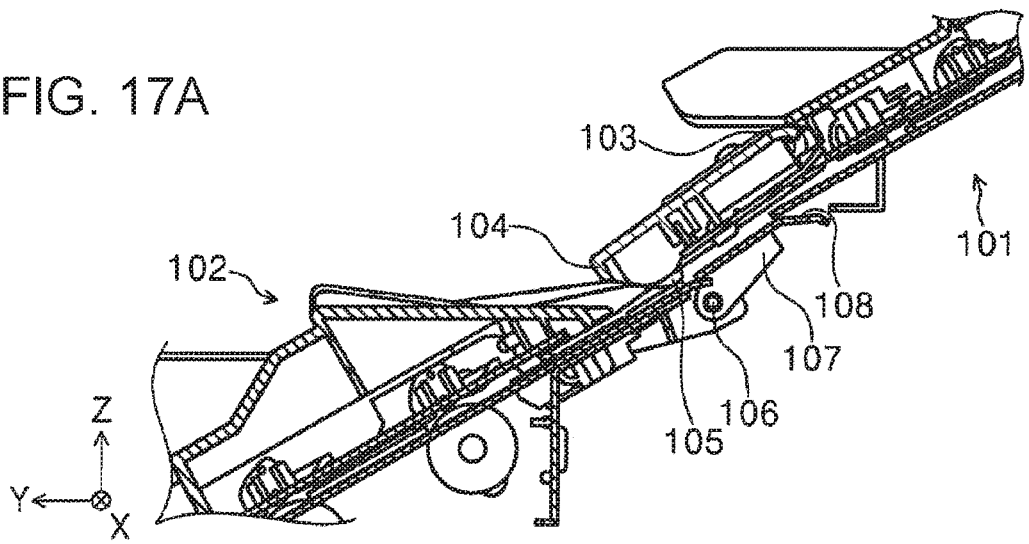
FIG. 17A schematically illustrates the joint mechanism by which the recording unit and the intermediate unit are joined together while being apart from each other along the Y-axis by the standard distance and along the Z-axis by a distance longer than the standard distance.
Figure 17B:
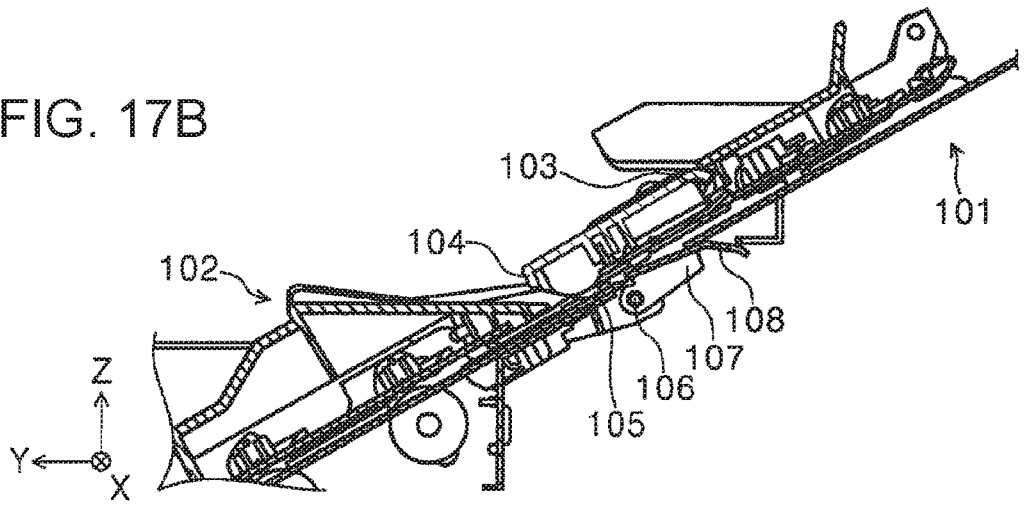
FIG. 17B schematically illustrates the joint mechanism by which the recording unit and the intermediate unit are joined together while being apart from each other along the Y-axis by the standard distance and along the Z-axis by the standard distance.
Figure 17C:
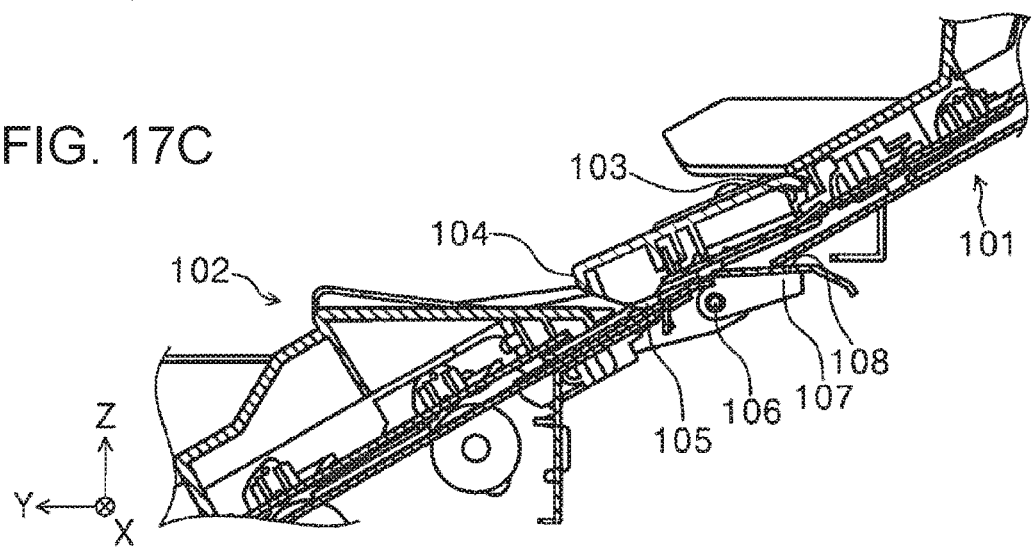
FIG. 17C schematically illustrates the joint mechanism by which the recording unit and the intermediate unit are joined together while being apart from each other along the Y-axis by the standard distance and along the Z-axis by a distance shorter than the standard distance.

In each of FIGS. 17A, 17B, and 17C, the upstream guide unit 101 and the downstream guide unit 102 are joined together while being apart from each other along the Y-axis by the standard distance. Moreover, in FIG. 17A, the upstream guide unit 101 is positioned apart from the downstream guide unit 102 along the Z-axis by a distance about 5 mm longer than the standard distance. In FIG. 17B, the upstream guide unit 101 is positioned apart from the downstream guide unit 102 along the Z-axis by the standard distance. In FIG. 17C, the upstream guide unit 101 is positioned apart from the downstream guide unit 102 along the Z-axis by a distance about 5 mm shorter than the standard distance.

Figure 18A:
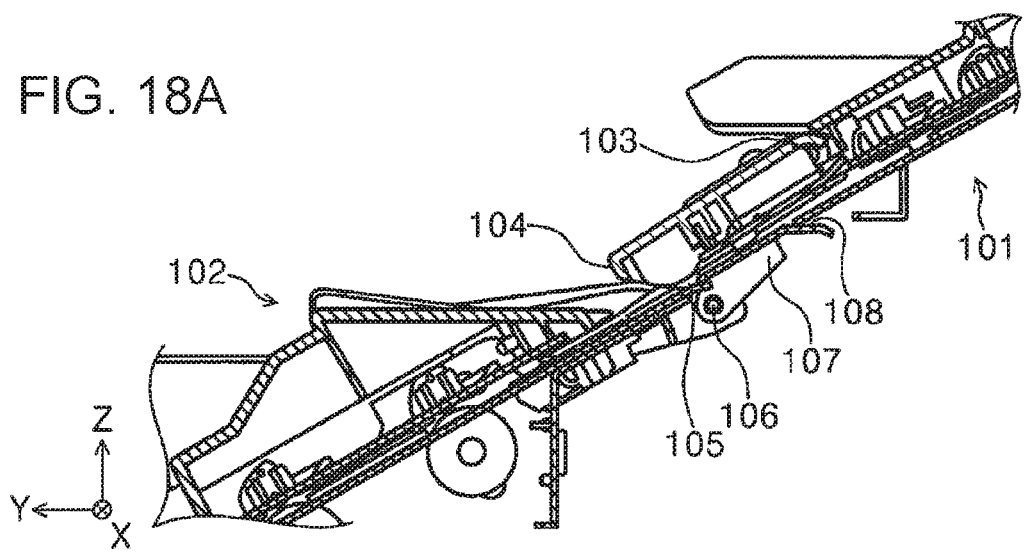
FIG. 18A schematically illustrates the joint mechanism by which the recording unit and the intermediate unit are joined together while being apart from each other along the Y-axis by a distance longer than the standard distance and along the Z-axis by a distance longer than the standard distance.
Figure 18B:
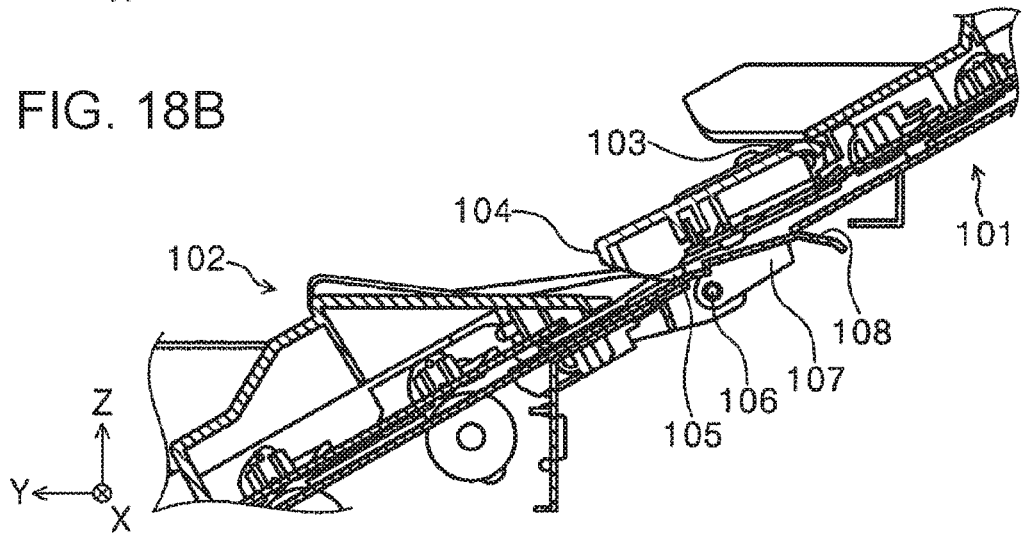
FIG. 18B schematically illustrates the joint mechanism by which the recording unit and the intermediate unit are joined together while being apart from each other along the Y-axis by the distance longer than the standard distance and along the Z-axis by the standard distance.
Figure 18C:
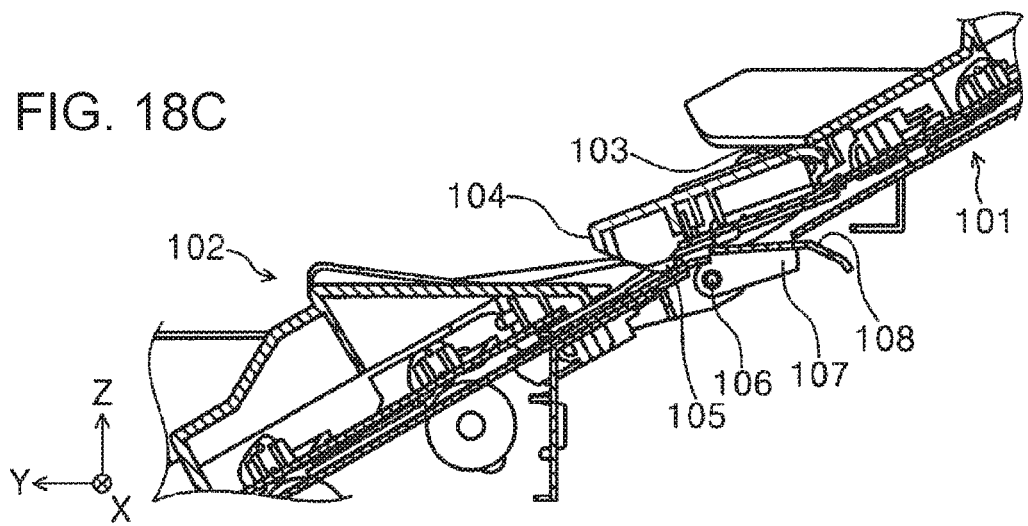
FIG. 18C schematically illustrates the joint mechanism by which the recording unit and the intermediate unit are joined together while being apart from each other along the Y-axis by the distance longer than the standard distance and along the Z-axis by a distance shorter than the standard distance.
Figure 19:
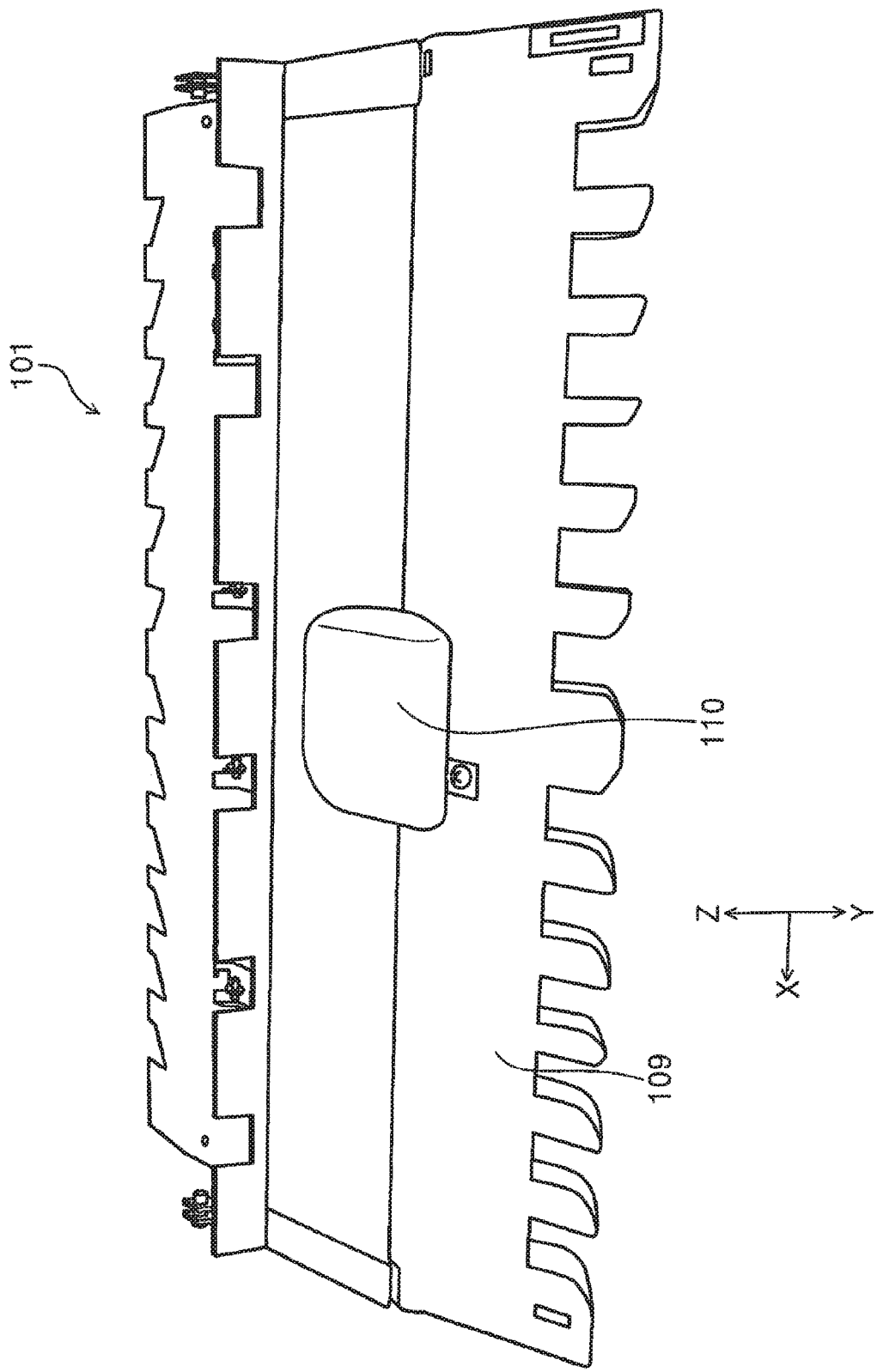
FIG. 19 schematically illustrates the upstream guide unit.

In each of FIGS. 18A, 18B, and 18C, the upstream guide unit 101 and the downstream guide unit 102 are joined together while being apart from each other along the Y-axis by a distance about 5 mm longer than the standard distance. Moreover, in FIG. 18A, the upstream guide unit 101 is positioned apart from the downstream guide unit 102 along the Z-axis by a distance about 5 mm longer than the standard distance. In FIG. 18B, the upstream guide unit 101 is positioned apart from the downstream guide unit 102 along the Z-axis by the standard distance. In FIG. 18C, the upstream guide unit 101 is positioned apart from the downstream guide unit 102 along the Z-axis by a distance about 5 mm shorter than the standard distance.

As illustrated in FIGS. 16A to 18C, when the recording unit 2 is joined to the intermediate unit 3 via the joint mechanism 100 in this embodiment, the joint mechanism 100 allows for some misalignment, along the Y- and Z-axes, of both the transport routes in the upstream guide unit 101 and in the downstream guide unit 102. More specifically, the joint mechanism 100 includes the upstream guide unit 101 and the downstream guide unit 102: the upstream guide unit 101 is provided with an upstream member and a downstream member (first pivot section 104) arranged in the transport direction of a medium P with respect to the first pivot point 103; and the downstream guide unit 102 is provided with and an upstream member (second pivot section 107) and a downstream member arranged in the transport direction of the medium P with respect to the second pivot point 106. With these components, the joint mechanism 100 is deformable in a substantially rhomboid shape as viewed from one longitudinal side. Therefore, when the recording unit 2 is joined to the intermediate unit 3, the joint mechanism 100 can allow for some misalignment, along the Y- and Z-axes, of both the transport routes in the upstream guide unit 101 and in the downstream guide unit 102.

Figure 11:
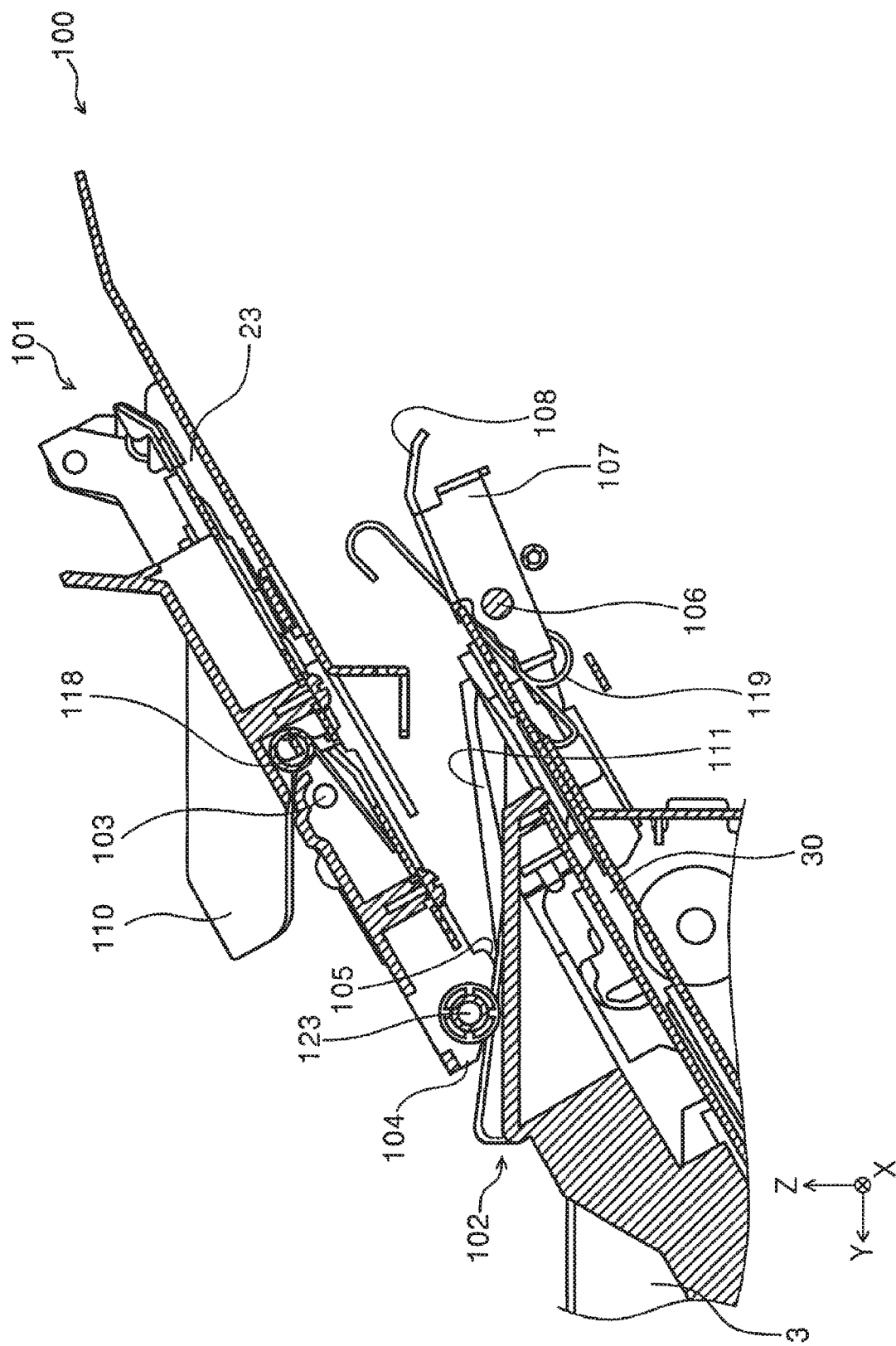
FIG. 11 is a schematic sectional view of the joint mechanism with the transport routes separated from each other.

In the joint mechanism 100, the first abutment member 105 is pressed against the downstream guide unit 102, whereas the second abutment member 108 is pressed against the upstream guide unit 101. More specifically, as illustrated in FIG. 11, the joint mechanism 100 includes a first press section 118 and a second press section 119, each of which may be implemented by a coil spring. When the recording unit 2 is joined to the intermediate unit 3, the first press section 118 presses the first pivot section 104 against the downstream guide unit 102, and the second press section 119 presses the second pivot section 107 against the upstream guide unit 101. As a result, the first abutment member 105 abuts against the downstream guide unit 102, and the second abutment member 108 abuts against the upstream guide unit 101. In this way, the joint mechanism 100 can reliably maintain a space to transport a medium P.

The upstream guide unit 101 includes an upstream cover unit 109 disposed opposite the first surface of a medium P, or disposed on the upper left side in FIG. 9. Disposed on the upstream cover unit 109 is a handle 110 in addition to the first pivot point 103 and the first pivot section 104. When the user holds the handle 110 of the joint mechanism in the state of FIG. 9 and then pulls out the upstream guide unit 101 in the +Y direction, the upstream guide unit 101 is separated from the downstream guide unit 102 as illustrated in FIG. 11. By separating the upstream guide unit 101 from the downstream guide unit 102 in this manner, the user can remove the medium P from the transport route if the joint mechanism 100 fails to transport a medium P along the transport route. The upstream guide unit 101 has a roller 123 (see FIG. 11) rotatable around the X-axis in order to help separate the upstream guide unit 101 from the downstream guide unit 102.

Figure 10:
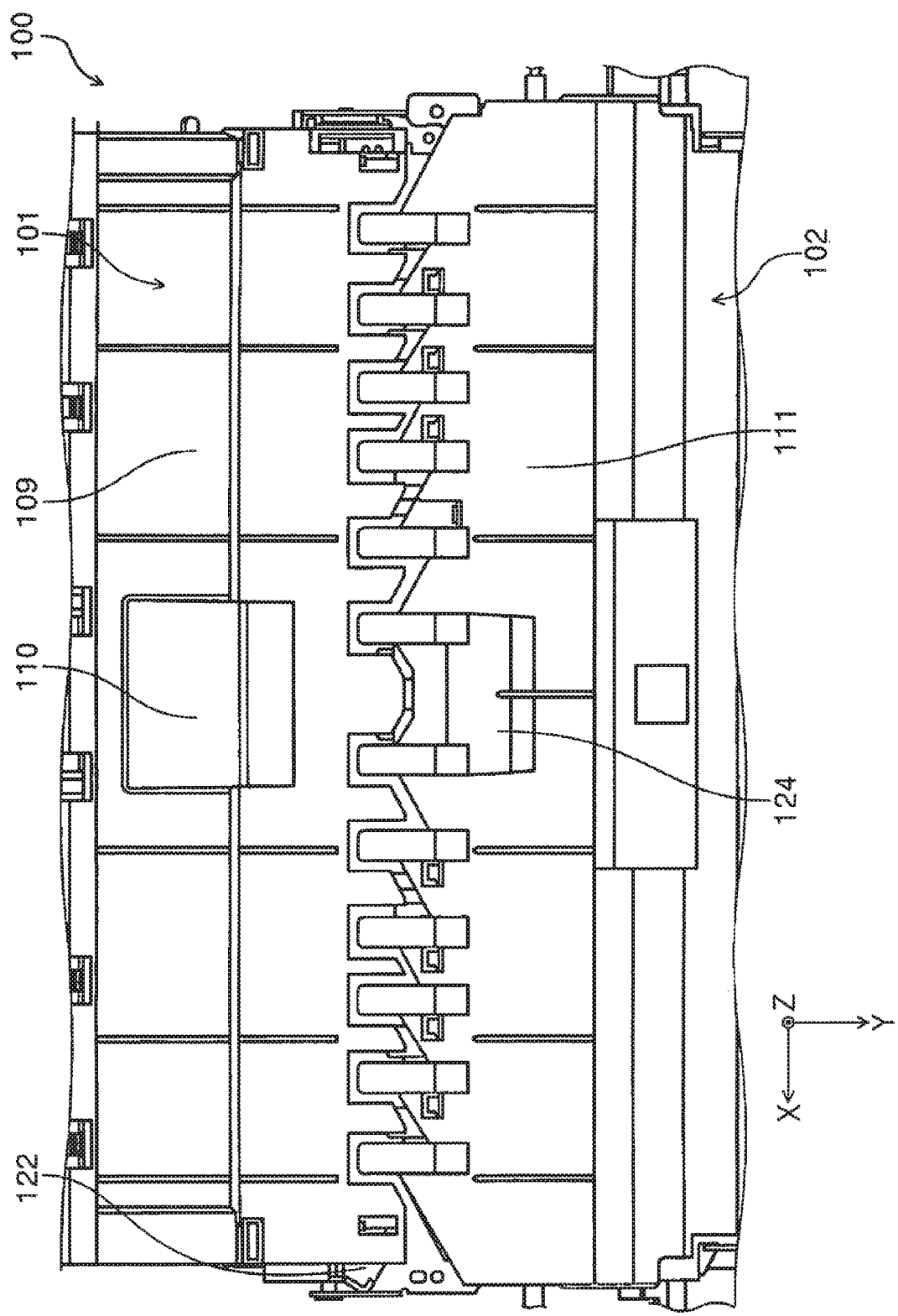
FIG. 10 is a schematic plan view of the joint mechanism.

As illustrated in FIGS. 10 and 22 to 24, the downstream guide unit 102 is provided with a downstream cover unit 111 disposed opposite the first surface of a medium P. As illustrated in FIGS. 10 and 19 to 21, the upstream guide unit 101 is provided with the upstream cover unit 109. The adjoining portions of the upstream cover unit 109 and the downstream cover unit 111 are pivotable away from constituent members disposed opposite the second surface of a medium P. As illustrated in FIG. 10, the adjoining sides of the upstream cover unit 109 and the downstream cover unit 111 are mutually staggered. With this configuration, even if the joint mechanism 100 fails to transport a medium P along the transport route formed by the upstream cover unit 109 and the downstream cover unit 111, the user can easily remove the medium P from the transport route by displacing the upstream guide unit 101 or the downstream guide unit 102. In short, the user removes the medium P from the transport route without separating the upstream guide unit 101 from the downstream guide unit 102. In this case, the user only has to hold the handle 110 and displace the upstream cover unit 109 away from the constituent members disposed opposite the second surface of the medium P. Alternatively, the user may hold a handle 124 in the downstream cover unit 111 and displace the downstream cover unit 111 away from the constituent members disposed opposite the second surface of the medium P.

Figure 13:
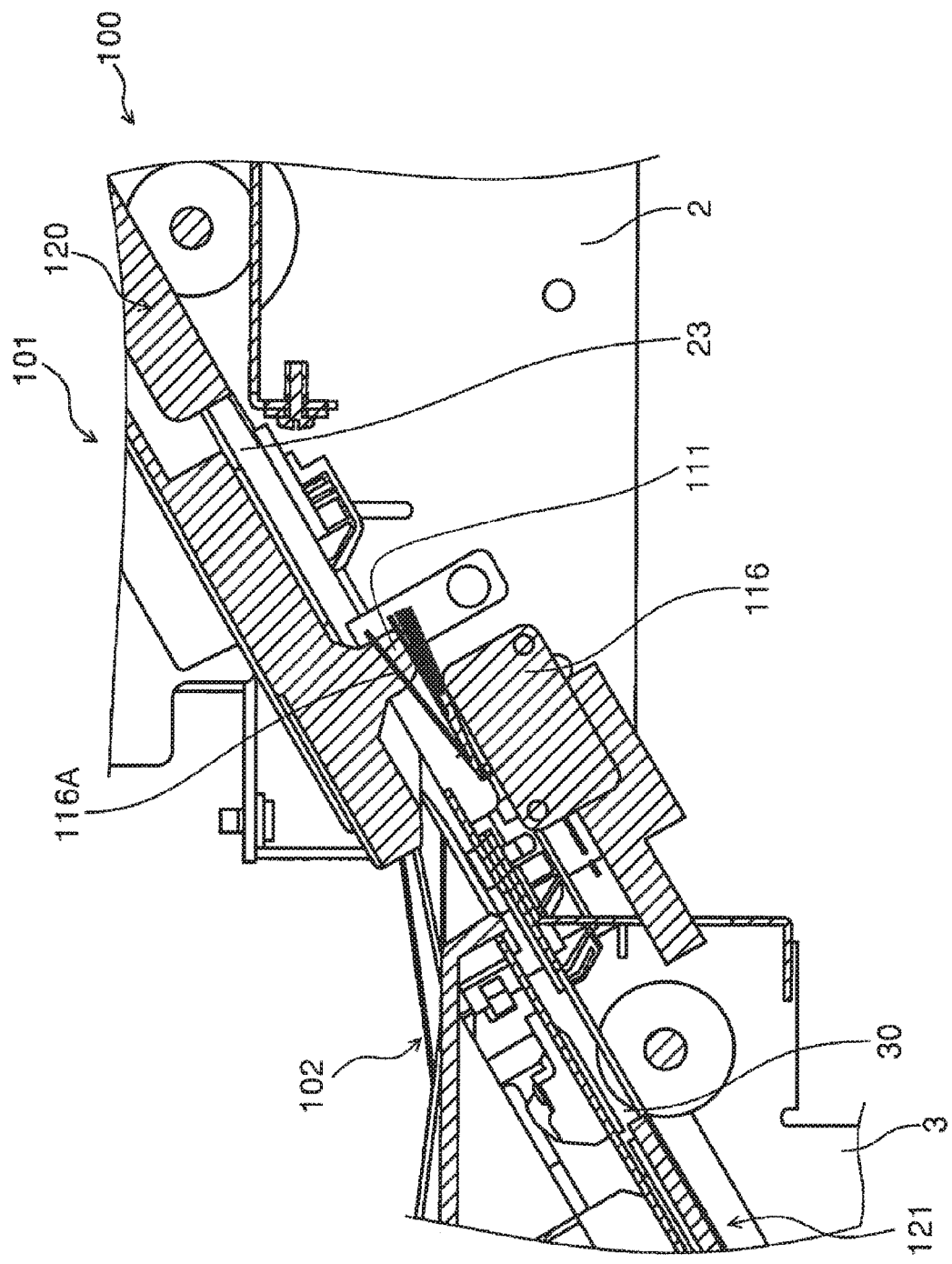
FIG. 13 is a schematic sectional view of the joint mechanism; this cross section being different from those in FIGS. 9 and 12.
Figure 20:
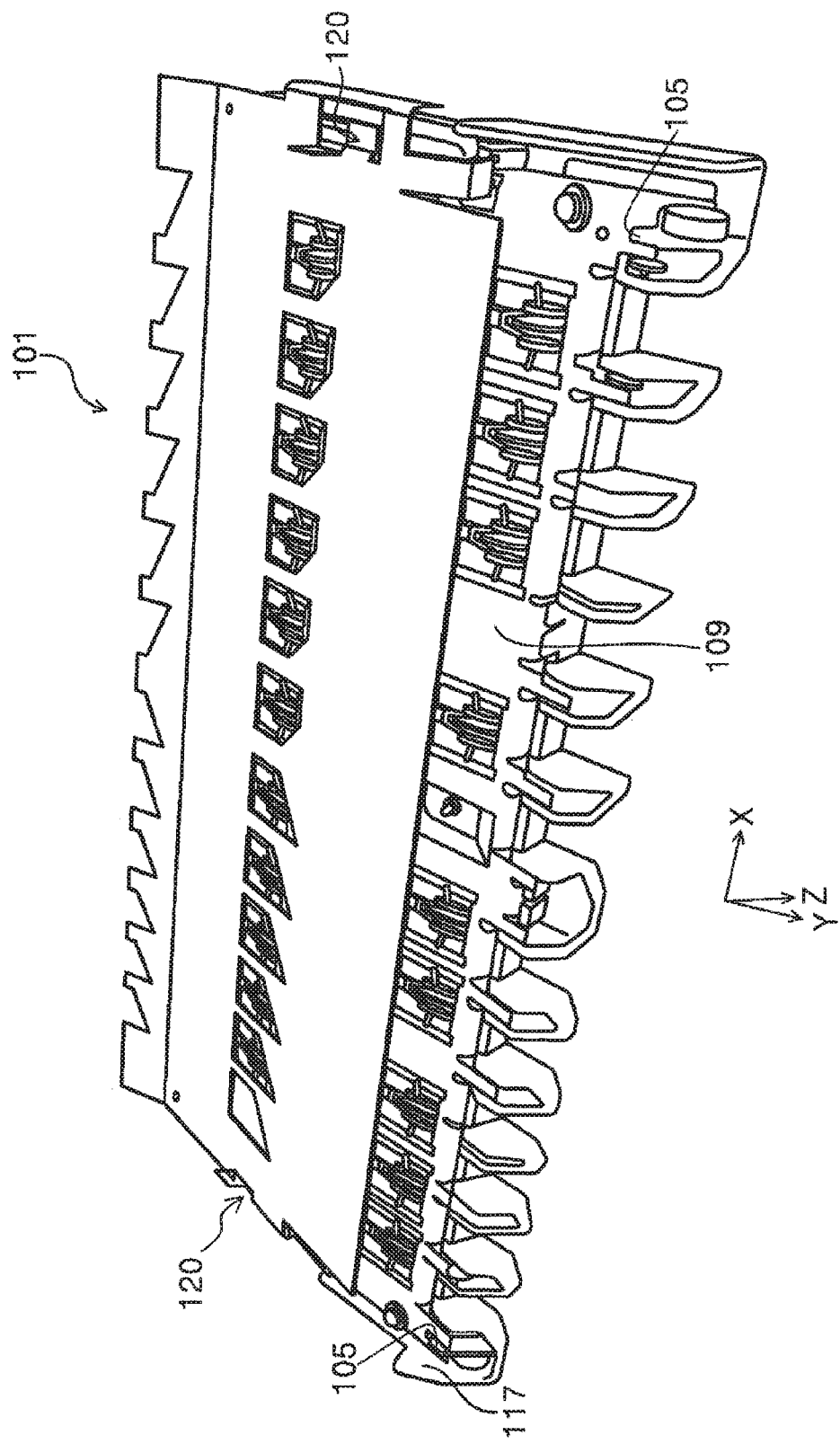
FIG. 20 schematically illustrates the upstream guide unit as viewed from an angle different from that in FIG. 19.
Figure 21:
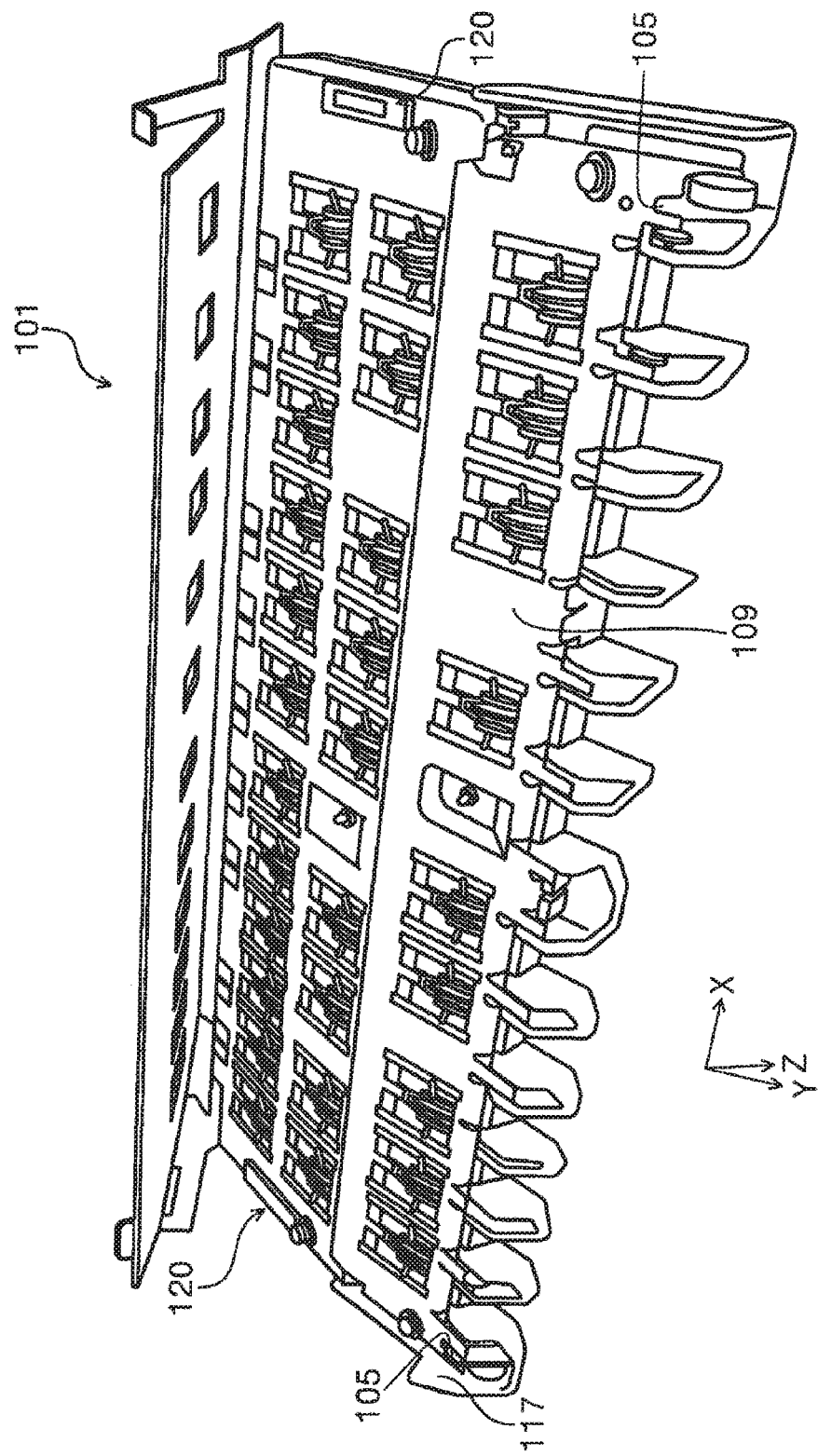
FIG. 21 schematically illustrates the upstream guide unit, with the upstream cover unit being open to expose constituent members on a second surface side of a medium.

As illustrated in FIGS. 13, 20, and 21, the upstream guide unit 101 has a magnet catch section 120 that includes a magnet and a magnetic material. The upstream cover unit 109 is fixed to the constituent members disposed opposite the second surface of the medium P by means of a magnetic force generated by the magnet catch section 120. The magnet catch section 120 is disposed near the both sides of the medium P along its width in order to avoid an interference with the transport of the medium P. Likewise, as illustrated in FIG. 13, the downstream guide unit 102 has a magnet catch section 121 that includes a magnet and a magnetic material. The downstream cover unit 111 is fixed to the constituent members disposed opposite the second surface of the medium P by means of a magnetic force generated by the magnet catch section 121. The magnet catch section 121 is disposed near the both sides of the medium P along its width in order to avoid an interference with the transport of the medium P.

Figure 12:
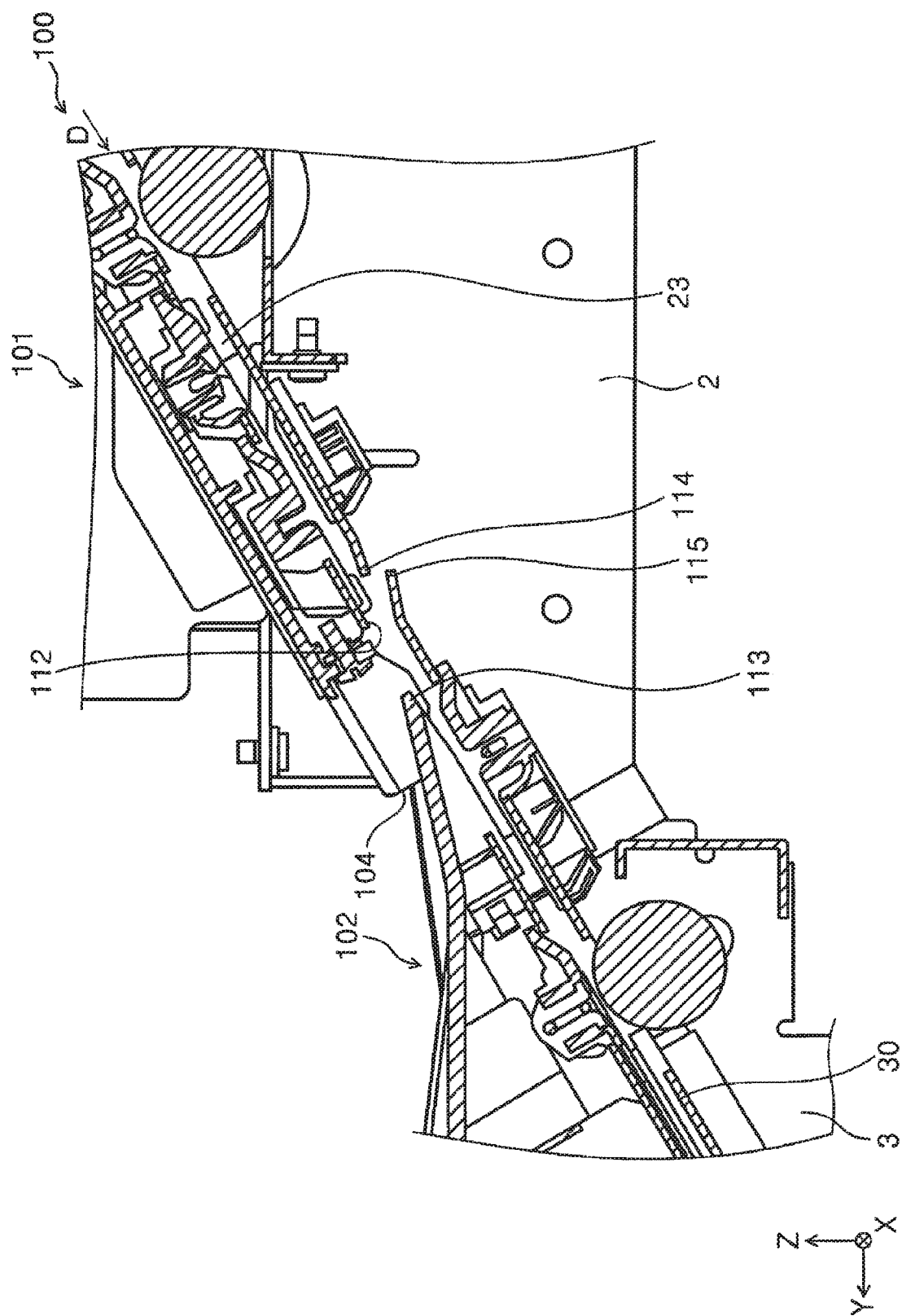
FIG. 12 is a schematic sectional view of the joint mechanism; this cross section being different from that in FIG. 9.

As illustrated in FIG. 12, with respect to a transport direction D of the medium P, a first-surface-side transport-route upstream end 113 of the downstream guide unit 102 is positioned further apart from the first side (closer to the upper left side of the page in FIG. 9) of the medium P than a first-surface-side transport-route downstream end 112 of the upstream guide unit 101. Likewise, with respect to the transport direction D of the medium P, a second-surface-side transport-route upstream end 115 of the downstream guide unit 102 is positioned farther apart from the second surface (closer to the lower left portion of the page in FIG. 9) of the medium P than a second-surface-side transport-route downstream end 114 of the upstream guide unit 101. With this configuration, the transport route of the upstream guide unit 101 can be inserted into that of the downstream guide unit 102. It is thus possible to suppress the medium P from being stuck in the transport route when a medium P passes through the transport route formed by the upstream guide unit 101 and the downstream guide unit 102.

With respect to the Z-axis, both the first-surface-side transport-route downstream end 112 and the second-surface-side transport-route downstream end 114 of the upstream guide unit 101 are shifted toward the +Z side more than both the first-surface-side transport-route upstream end 113 and the second-surface-side transport-route upstream end 115 of the downstream guide unit 102. With this configuration, as described above, the user can separate the recording unit 2 from the intermediate unit 3 by displacing the upstream guide unit 101 away from the downstream guide unit 102 along the Y-axis on which the recording unit 2 and the intermediate unit 3 are arranged when the recording unit 2 is joined to the intermediate unit 3. Consequently, it is possible to easily join the recording unit 2 to the intermediate unit 3 or separate from the recording unit 2 from the intermediate unit 3.

As illustrated in FIG. 12, when the recording unit 2 is joined to the intermediate unit 3, the transport route in the joint mechanism 100 which is formed by the upstream guide unit 101 and the downstream guide unit 102 slopes with respect to the Y-axis on which the recording unit 2 and the intermediate unit 3 are arranged. With this configuration, both of the upstream guide unit 101 and the downstream guide unit 102 are displaceable along the Y- and Z-axes that intersect each other, thereby easily joining the recording unit 2 to the intermediate unit 3 or easily separating the recording unit 2 from the intermediate unit 3.

When the recording unit 2 is joined to the intermediate unit 3 via the joint mechanism 100, the transport route formed by the upstream guide unit 101 and the downstream guide unit 102 preferably slopes down from the recording unit 2 to the intermediate unit 3, or from the first surface of a medium M to the second surface. In this case, the upstream guide unit 101 is displaceable along a horizontal line in which the recording unit 2 and the intermediate unit 3 are arranged, thereby easily joining the recording unit 2 to the intermediate unit 3 or easily separating the recording unit 2 from the intermediate unit 3.

Figure 14:
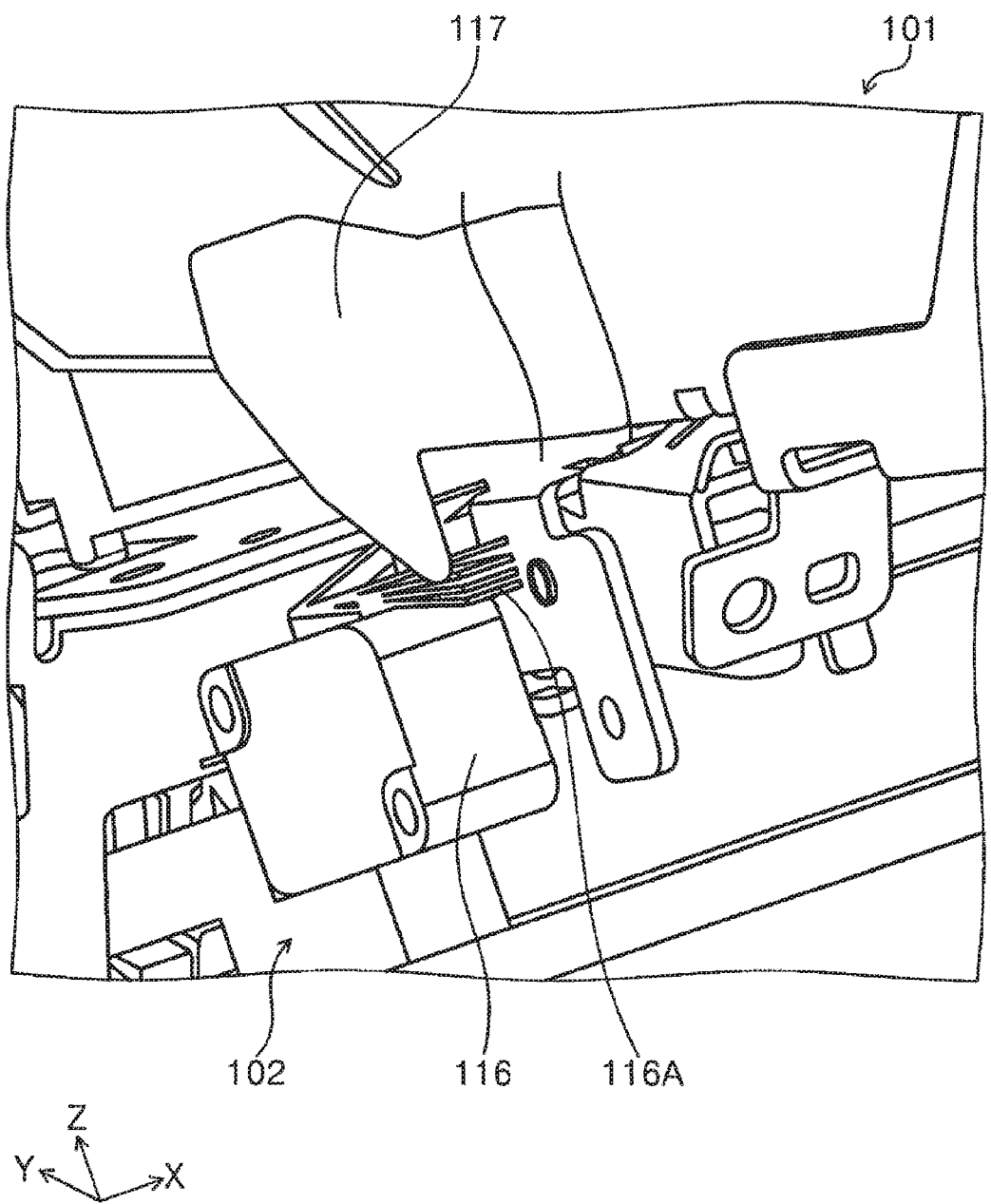
FIG. 14 schematically illustrates the joint sensor.
Figure 15:
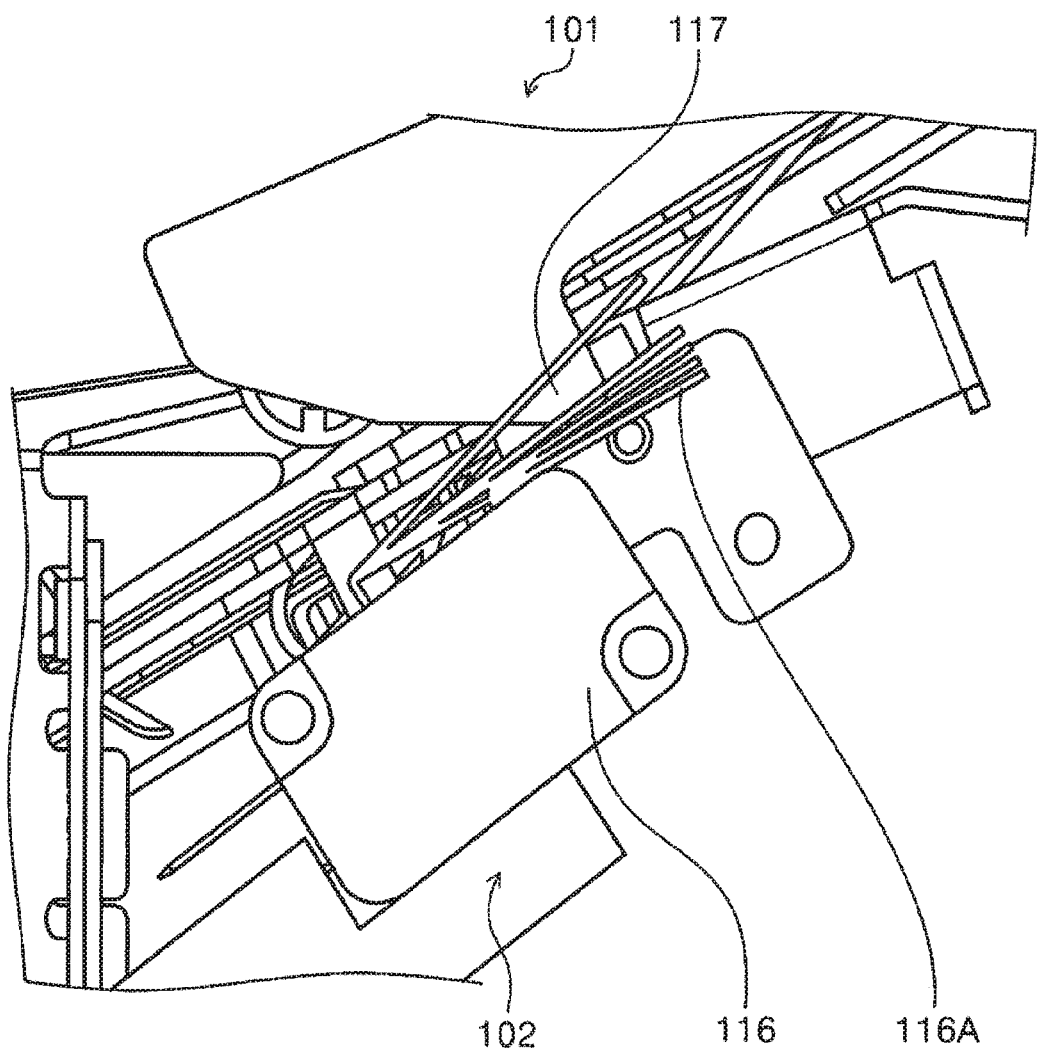
FIG. 15 schematically illustrates the joint sensor as viewed from an angle different from that in FIG. 14.
Figure 16A:
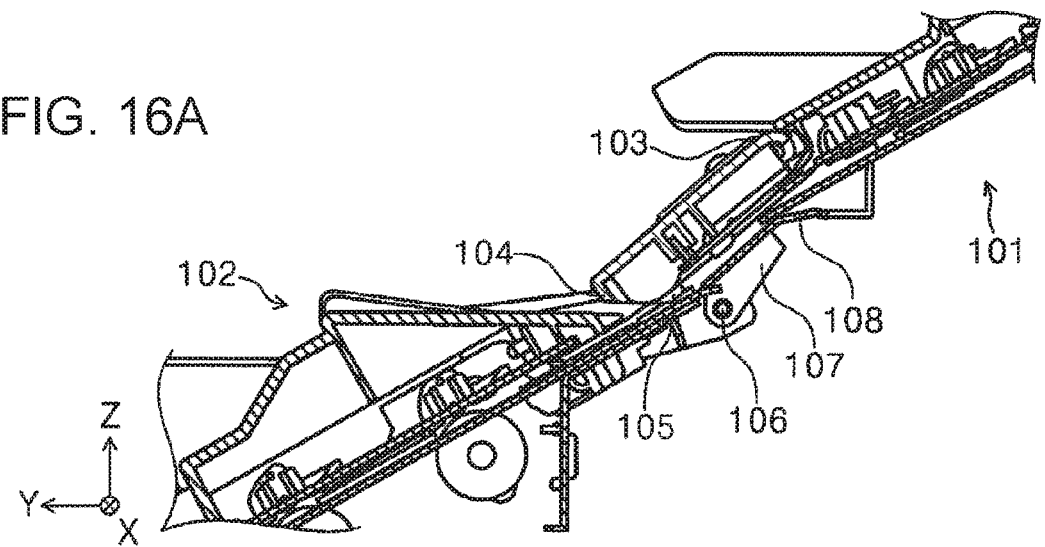
FIG. 16A schematically illustrates the joint mechanism by which the recording unit and the intermediate unit are joined together while being apart from each other along the Y-axis by a distance shorter than a standard distance and along the Z-axis by a distance longer than the standard distance.
Figure 16B:
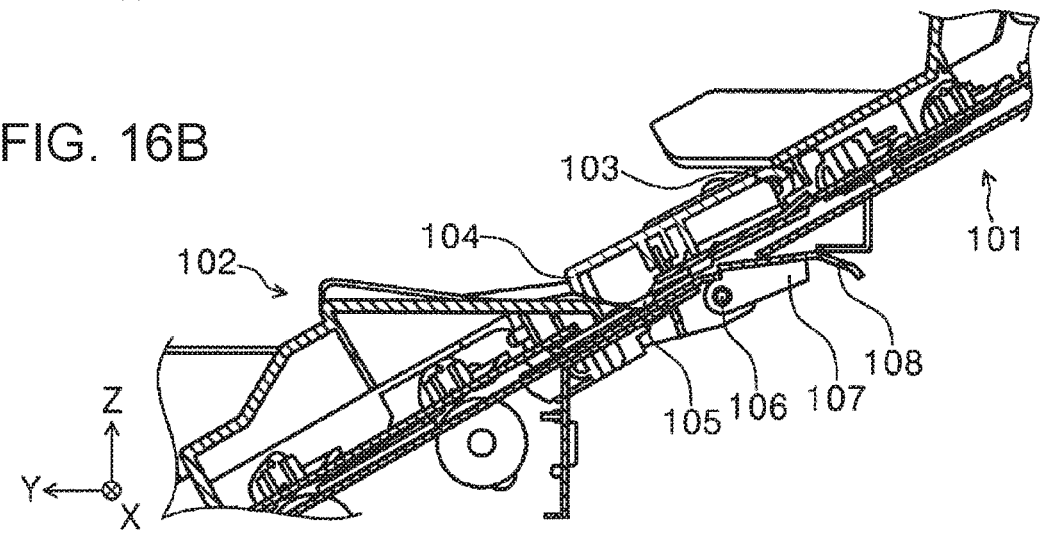
FIG. 16B schematically illustrates the joint mechanism by which the recording unit and the intermediate unit are joined together while being apart from each other along the Y-axis by the distance shorter than the standard distance and along the Z-axis by the standard distance.
Figure 16C:
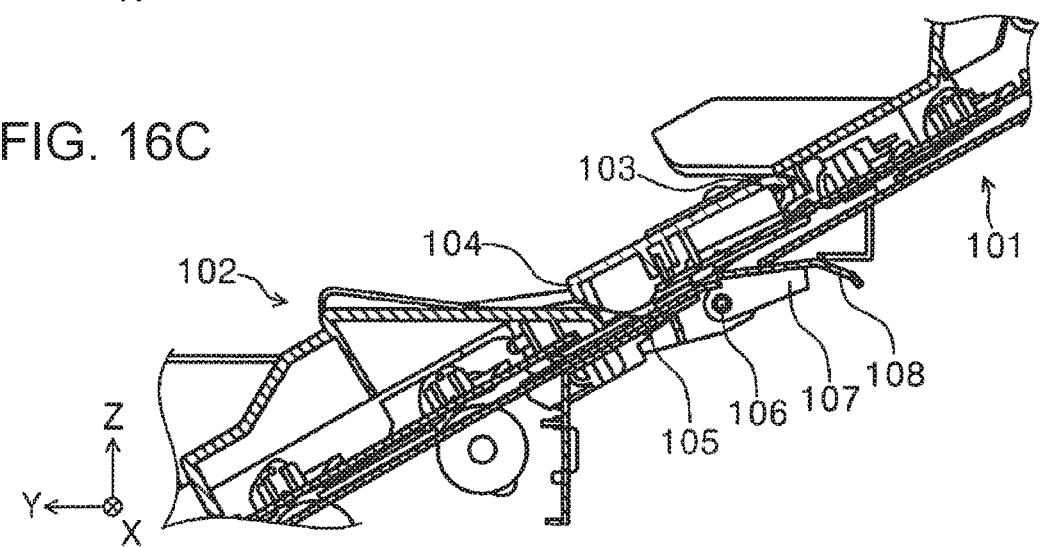
FIG. 16C schematically illustrates the joint mechanism by which the recording unit and the intermediate unit are joined together while being apart from each other along the Y-axis by the distance shorter than the standard distance and along the Z-axis by a distance shorter than the standard distance.

In the joint mechanism 100, as illustrated in FIGS. 13 to 15, the downstream guide unit 102 includes a joint sensor 116 that detects whether the upstream guide unit 101 is joined to the downstream guide unit 102. The joint sensor 116 has a pressed plate 116A to be pressed by a detection object. The joint sensor 116 detects presence of an object in response to an event in which the pressed plate 116A is pressed. More specifically, the joint sensor 116 detects that the upstream guide unit 101 is joined to the downstream guide unit 102, in response to an event in which a pressed section 117 disposed in the upstream guide unit 101 presses the pressed plate 116A when the upstream guide unit 101 is joined to the downstream guide unit 102. The pressed plate 116A may have any size and be disposed at any location as long as it is reliably pressed by the pressed section 117 when the upstream guide unit 101 is joined to the downstream guide unit 102. It should be noted that in each of FIGS. 13 to 15, a plurality of flat objects denoted by the reference character 116A are positioned at different locations. These flat objects specify a movable range of the pressed plate 116A.

Figure 22:
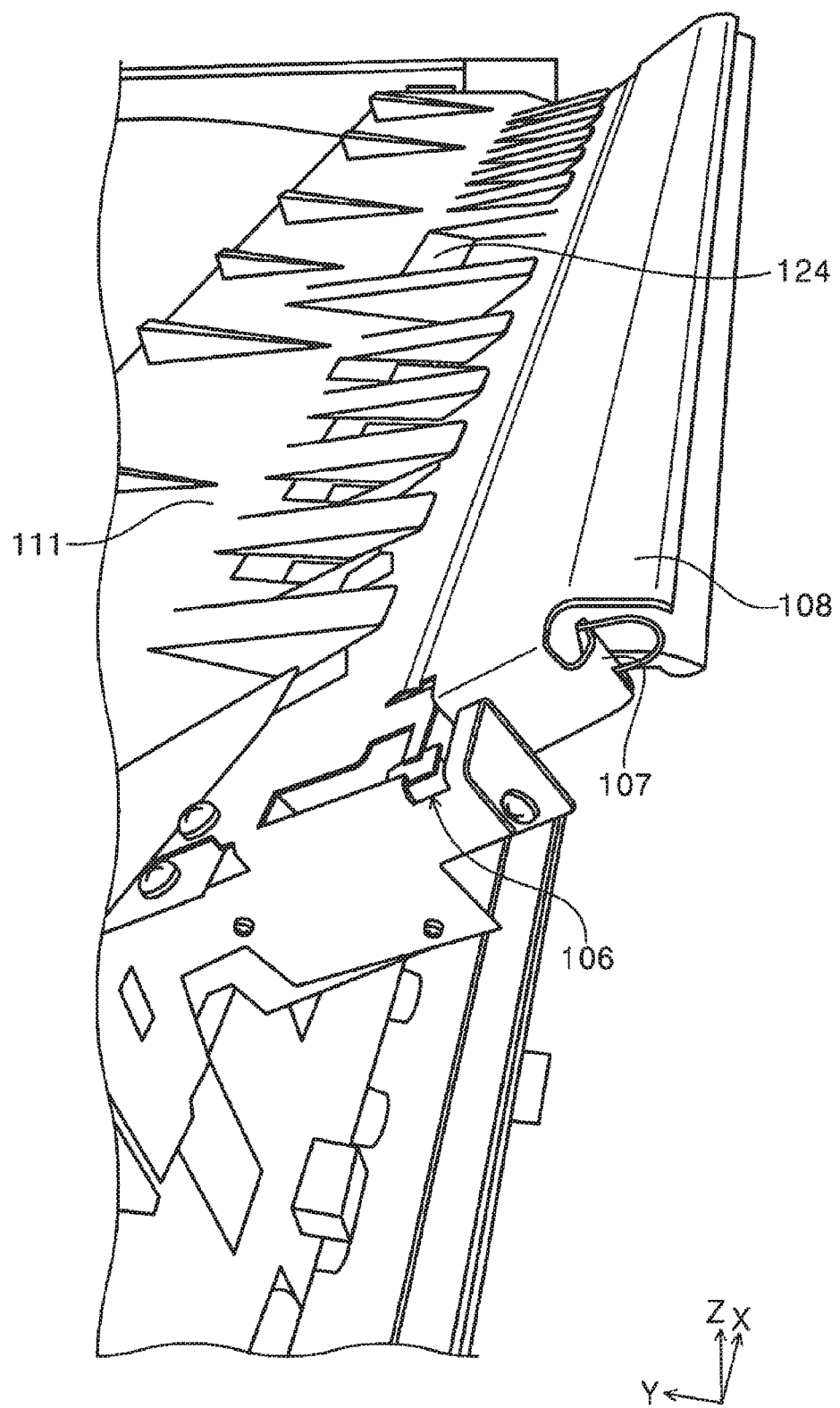
FIG. 22 schematically illustrates the downstream guide unit.
Figure 23:
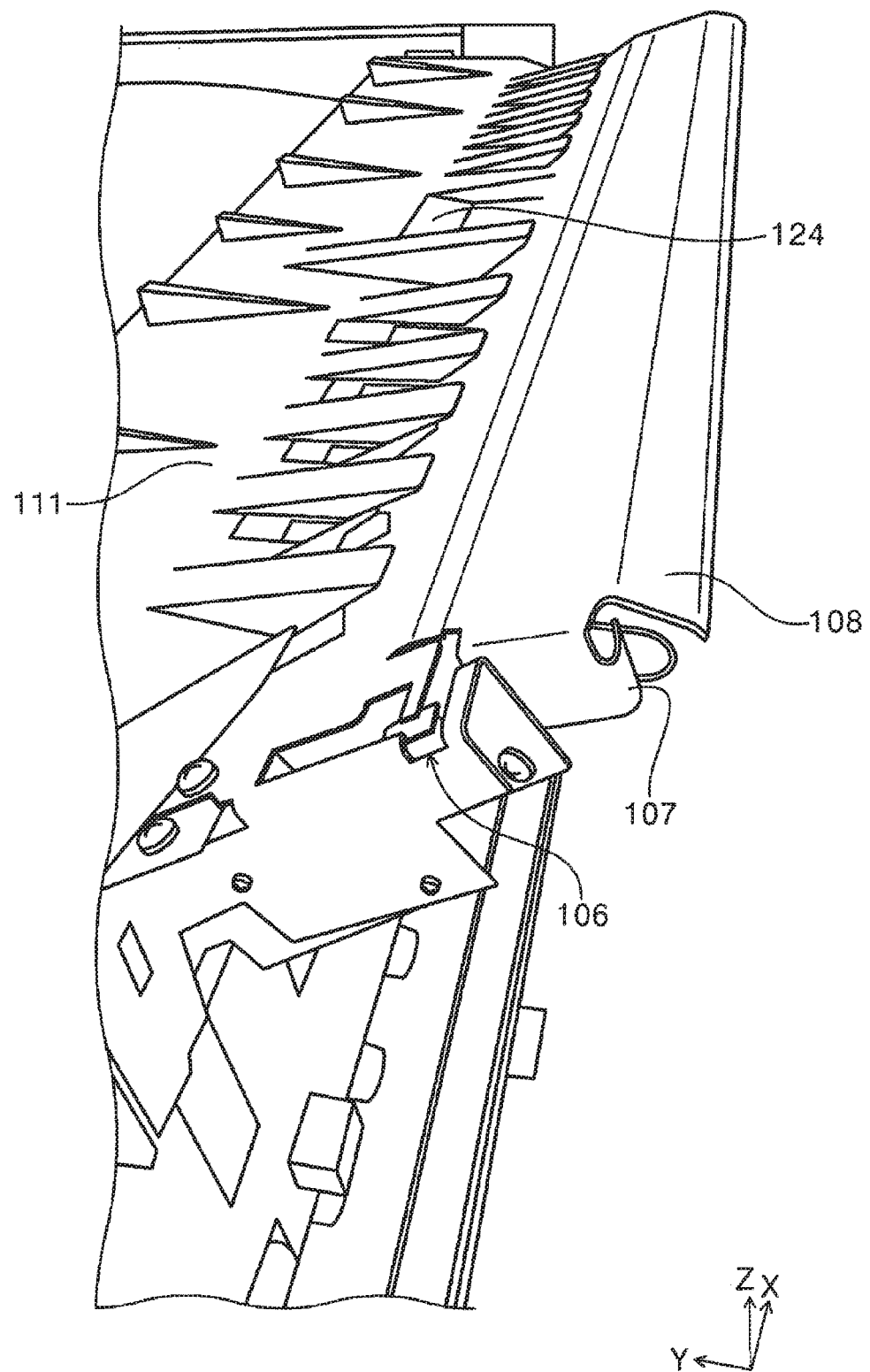
FIG. 23 schematically illustrates the downstream guide unit in which the second pivot section slopes at an angle different from that in FIG. 22.
Figure 24:
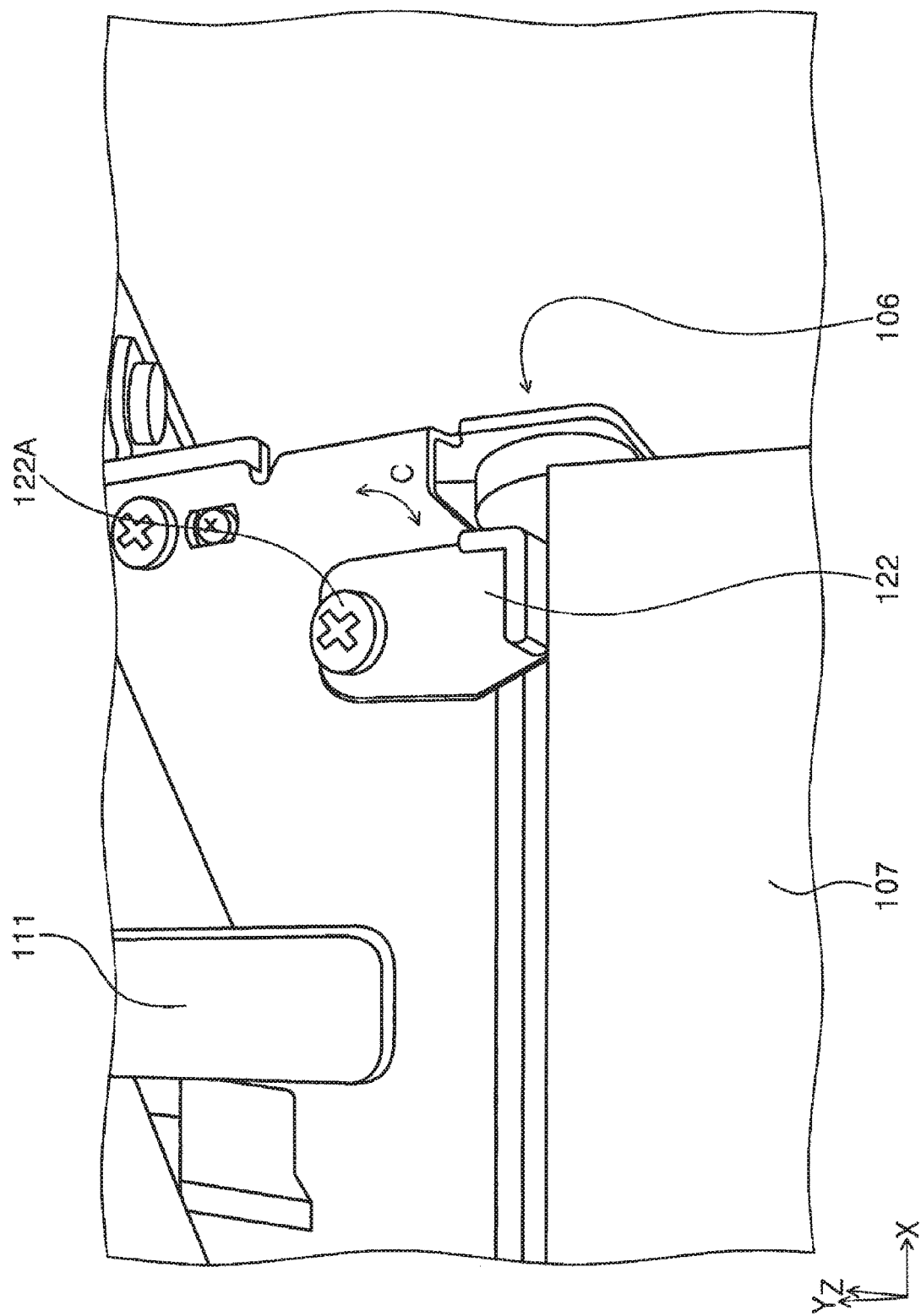
FIG. 24 schematically illustrates the anti-interference member in the downstream guide unit which fixes the second pivot section in the state in FIG. 23.

In the joint mechanism 100, as illustrated in FIGS. 16A to 18C, 22, and 23, the second pivot section 107 is pivotable about the second pivot point 106, thereby changing its attitude. In FIG. 22, the second pivot section 107 is pivoted around the second pivot point 106 to a higher location; in FIG. 23, the second pivot section 107 is pivoted downward around the second pivot point 106 to a lower location. As illustrated in FIG. 24, the joint mechanism 100 further includes an anti-interference member 122 that maintains the attitude of the second pivot section 107 in the state of FIG. 23. The anti-interference member 122 is pivotable about a rotation center 122A in rotation directions C. By being disposed at the location of FIG. 24, the anti-interference member 122 can maintain the second pivot section 107 in the attitude of FIG. 23. In FIG. 24, the anti-interference member 122 maintains the second pivot section 107 in the attitude of FIG. 23, whereas in FIG. 10, the anti-interference member 122 does not maintain the second pivot section 107 in the attitude of FIG. 23.

When the recording unit 2 is joined to the intermediate unit 3 via the joint mechanism 100, the anti-interference member 122 moves one of the first pivot section 104 and the second pivot section 107 away from within the movable range of the other and makes it stay where the one of the first pivot section 104 and the second pivot section 107 does not disturb the movement of the other. When the recording unit 2 is joined to the intermediate unit 3 via the joint mechanism 100, neither the first pivot section 104 nor the second pivot section 107 can be an obstacle.

The foregoing embodiment is not intended to limit the present disclosure; therefore it can be modified in various ways without departing from the scope of the claims, and those modifications obviously fall within the scope of the present disclosure.

What is claimed is:

1. A joint mechanism that joins a first apparatus to a second apparatus, the joint mechanism having a transport route along which a sheet-shaped medium is to be transported from the first apparatus to the second apparatus, the joint mechanism comprising:
   a first route member including
      a first pivot point that forms a portion the transport route positioned opposite a first surface of the sheet-shaped medium, the first pivot point being positioned in the first apparatus,
      a first pivot section that is pivotable about the first pivot point, the first pivot section extending from the first pivot point toward the second apparatus, and
      a first abutment member disposed in the first pivot section; and
   a second route member including
      a second pivot point that forms a portion of the transport route which is positioned opposite a second surface of the sheet-shaped medium, the second surface being opposite to the first surface, the second pivot point being positioned in the second apparatus,
      a second pivot section that is pivotable about the second pivot point, the second pivot section extending from the second pivot point toward the first apparatus, and
      a second abutment member disposed in the second pivot section,
   wherein the first abutment member abuts against the second route member and the second abutment member abuts against the first route member to maintain a space to transport the sheet-shaped medium.

2. The joint mechanism according to claim 1, further comprising:
   a first press section that presses the first pivot section against the second route member when the first apparatus is joined to the second apparatus; and
   a second press section that presses the second pivot section against the first route member when the first apparatus is joined to the second apparatus.

3. The joint mechanism according to claim 1, further comprising
   an anti-interference member that, when the first apparatus is joined to the second apparatus, moves one of the first pivot section and the second pivot section away from within a movable range of the other and makes the one of the first pivot section and the second pivot section stay where the one of the first pivot section and the second pivot section does not disturb a movement of the other.

4. The joint mechanism according to claim 1, wherein
when the first apparatus is joined to the second apparatus,
the transport route formed by the first route member and the second route member slopes with reference to a line in which the first apparatus and the second apparatus are arranged.

5. The joint mechanism according to claim 4, wherein
when the first apparatus is joined to the second apparatus,
the transport route formed by the first route member and the second route member slopes down from the first apparatus to the second apparatus, and
the first surface is oriented upward, and the second surface is oriented downward.

6. The joint mechanism according to claim 5, wherein
downstream ends of the first route member on a first surface side and on a second surface side are positioned higher than upstream ends of the second route member on the first surface side and on the second surface side.

7. The joint mechanism according to claim 1, wherein
the first route member and the second apparatus joined together are configured to be separated from each other by displacing the first route member along a line in which the first apparatus and the second apparatus are arranged.

8. The joint mechanism according to claim 1, wherein
the upstream end of the second route member on the first surface side is positioned farther from the transport route than the downstream end of the first route member on the first surface side, and
the upstream end of the second route member on the second surface side is positioned farther from the transport route than the downstream end of the first route member on the second surface side.

9. The joint mechanism according to claim 1, wherein
the first apparatus and the second apparatus joined together are configured to be separated from each other by displacing the first route member toward the second apparatus.

10. The joint mechanism according to claim 1, wherein
the first route member has an upstream cover that is pivotable and openable,
the second route member has a downstream cover that is pivotable and openable, and
when the first apparatus is joined to the second apparatus, the transport route is configured to be exposed by opening one or both of the upstream cover and the downstream cover.

11. The joint mechanism according to claim 2, further comprising
an anti-interference member that, when the first apparatus is joined to the second apparatus, moves one of the first pivot section and the second pivot section away from within a movable range of the other and makes the one of the first pivot section and the second pivot section stay where the one of the first pivot section and the second pivot section does not disturb a movement of the other.

12. The joint mechanism according to claim 11, wherein
when the first apparatus is joined to the second apparatus,
the transport route formed by the first route member and the second route member slopes with reference to a line in which the first apparatus and the second apparatus are arranged.

13. The joint mechanism according to claim 12, wherein
when the first apparatus is joined to the second apparatus,
the transport route formed by the first route member and the second route member slopes down from the first apparatus to the second apparatus, and
the first surface is oriented upward, and the second surface is oriented downward.

14. The joint mechanism according to claim 7, wherein
the upstream end of the second route member on the first surface side is positioned farther from the transport route than the downstream end of the first route member on the first surface side, and
the upstream end of the second route member on the second surface side is positioned farther from the transport route than the downstream end of the first route member on the second surface side.

15. The joint mechanism according to claim 14, wherein
the first apparatus and the second apparatus joined together are configured to be separated from each other by displacing the first route member toward the second apparatus.

16. The joint mechanism according to claim 15, wherein
the first route member has an upstream cover that is pivotable and openable,
the second route member has a downstream cover that is pivotable and openable, and
when the first apparatus is joined to the second apparatus, the transport route is configured to be exposed by opening one or both of the upstream cover and the downstream cover.

17. The joint mechanism according to claim 4, wherein
the first route member and the second apparatus joined together are configured to be separated from each other by displacing the first route member along a line in which the first apparatus and the second apparatus are arranged.

18. The joint mechanism according to claim 17, wherein
the upstream end of the second route member on the first surface side is positioned farther from the transport route than the downstream end of the first route member on the first surface side, and
the upstream end of the second route member on the second surface side is positioned farther from the transport route than the downstream end of the first route member on the second surface side.

19. The joint mechanism according to claim 18, wherein
the first apparatus and the second apparatus joined together are configured to be separated from each other by displacing the first route member toward the second apparatus.

20. The joint mechanism according to claim 19, wherein
the first route member has an upstream cover that is pivotable and openable,
the second route member has a downstream cover that is pivotable and openable, and
when the first apparatus is joined to the second apparatus, the transport route is configured to be exposed by opening one or both of the upstream cover and the downstream cover.

* * * * *